(12) United States Patent
Garratt et al.

(10) Patent No.: US 6,974,633 B2
(45) Date of Patent: Dec. 13, 2005

(54) STRUCTURAL MEMBERS HAVING IMPROVED RESISTANCE TO FATIGUE CRACK GROWTH

(75) Inventors: Matthew D. Garratt, Pittsburgh, PA (US); Gary H. Bray, Murrsyville, PA (US); Diana K. Denzer, Lower Burrell, PA (US); Patrick Ulysse, Pittsburgh, PA (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 10/798,009

(22) Filed: Mar. 10, 2004

(65) Prior Publication Data

US 2005/0241735 A1 Nov. 3, 2005

Related U.S. Application Data

(63) Continuation of application No. 10/286,937, filed on Nov. 2, 2002, now abandoned.

(60) Provisional application No. 60/339,715, filed on Nov. 2, 2001.

(51) Int. Cl.[7] .............................................. C22F 1/057
(52) U.S. Cl. ...................... 428/598; 428/600; 428/603; 148/415; 148/416; 148/418; 148/902
(58) Field of Search ................................. 428/598, 603, 428/600, 599; 148/902, 689, 415, 416, 418, 148/699, 700

(56) References Cited

U.S. PATENT DOCUMENTS

| | | | | |
|---|---|---|---|---|
| 522,736 | A | * | 7/1894 | Krause ....................... 52/729.2 |
| 4,294,625 | A | * | 10/1981 | Hyatt et al. .................. 148/550 |
| 4,336,075 | A | * | 6/1982 | Quist et al. .................. 148/550 |
| 5,061,327 | A | * | 10/1991 | Denzer et al. .............. 148/693 |
| 5,071,492 | A | * | 12/1991 | Parker et al. ................ 148/157 |
| RE34,008 | E | * | 7/1992 | Quist et al. ..................... 148/2 |
| 5,194,102 | A | * | 3/1993 | Wyss .......................... 148/695 |
| 5,221,377 | A | * | 6/1993 | Hunt et al. .................. 148/417 |
| 5,759,302 | A | * | 6/1998 | Nakai et al. ................. 148/415 |
| 5,826,456 | A | * | 10/1998 | Kawazoe et al. ........... 72/253.1 |
| 5,863,359 | A | * | 1/1999 | Karabin et al. ............. 148/437 |
| 5,865,911 | A | * | 2/1999 | Miyasato et al. ........... 148/439 |
| 5,865,914 | A | * | 2/1999 | Karabin et al. ............. 148/693 |
| 5,980,206 | A | * | 11/1999 | Hunter et al. ........... 416/134 A |
| 6,113,711 | A | * | 9/2000 | Armanie et al. ............ 148/689 |
| 6,231,995 | B1 | * | 5/2001 | Yamashita et al. .......... 428/598 |

(Continued)

FOREIGN PATENT DOCUMENTS

JP 04-022508 * 1/1992

(Continued)

OTHER PUBLICATIONS

K.R. Van Horn, "Factors Affecting Directional Properties in Aluminum Wrought Products", pp. 38-76, Transactions of the ASM, vol. 47, presented at the 36th Annual Convention of the Society, Chicago, Il, Nov. 3, 1954.*

(Continued)

Primary Examiner—John J. Zimmerman
(74) Attorney, Agent, or Firm—D. Mark Maloney; Eckert Seamans Cherin & Mellott, LLC

(57) ABSTRACT

An extruded structural member having improved damage tolerance containing a base section (6); a stiffening section having at least one pair of structural stiffeners (10), the structural stiffeners integral with the base section (6) and projecting outwardly thereof; and at least one intra-stiffener (90) area positioned between the pair of structural stiffeners (10), the intra-stiffener area (90) having a microstructure with intentionally increased amounts of fiber texture to reduce the rate of fatigue crack growth in the extruded structural member.

33 Claims, 19 Drawing Sheets

U.S. PATENT DOCUMENTS

| | | | |
|---|---|---|---|
| 6,277,219 B1 * | 8/2001 | Heinz et al. | 148/552 |
| 6,325,869 B1 * | 12/2001 | Liu et al. | 148/439 |
| 6,364,250 B1 * | 4/2002 | Brinck et al. | 344/119 |
| 6,444,058 B1 * | 9/2002 | Liu et al. | 148/439 |
| 2001/0020501 A1 * | 9/2001 | Liu et al. | 148/690 |
| 2002/0000492 A1 * | 1/2002 | Schmidt | 244/125 |
| 2002/0014287 A1 * | 2/2002 | Yoshihara et al. | 148/417 |
| 2002/0043640 A1 * | 4/2002 | Takemoto et al. | 251/368 |
| 2002/0150498 A1 * | 10/2002 | Chakrabarti et al. | 420/532 |
| 2003/0008165 A1 * | 1/2003 | Kawai et al. | 428/586 |

FOREIGN PATENT DOCUMENTS

JP      11-071624  *  3/1999

OTHER PUBLICATIONS

H.Y. Hunsicker, "New Graphic Method for Analysis of Hot Deformation and Effects on Directional Properties", pp. 29-42, Transactions of the Metallurgical Society of AIME, vol. 245, Jan. 1969.*

P.I. Welch et al., "The Effect of Texture on Fatigue Crack Propagation in Aluminum Alloy 7075", pp. 332-335, ALUMINUM, 61 Jahrg 1985.*

D.L. Chen et al., "Fatigue Crack Growth Behavior of X2095 Al-Li Alloy", pp. 1079-1086, International Journal of Fatigue 21, 1999.*

* cited by examiner (111) POLE FIGURE IN LONGITUDINAL PLANE, FIBER TEXTURE (111) POLE FIGURE IN LONGITUDINAL PLANE, ROLLING TYPE TEXTURE

STRUCTURAL MEMBERS HAVING IMPROVED RESISTANCE TO FATIGUE CRACK GROWTH

CROSS REFERENCE TO RELATED APPLICATIONS

This application is a continuation of U.S. patent application Ser. No. 10/286,937, filed Nov. 2, 2002 now abandoned, entitled "Structural Members Having Improved Resistance To Fatigue Crack Growth", which claims the benefit of U.S. Provisional Patent Application Ser. No. 60/339,715, filed Nov. 2, 2001, which is incorporated herein in its entirety.

FIELD OF THE INVENTION

This invention pertains to damage tolerant aluminum structures made from aluminum alloys and the methods of making such structures.

BACKGROUND OF THE INVENTION

As the size of new jet aircraft gets larger, or as current jetliner models grow to accommodate heavier payloads and/or longer flight ranges to improve performance and economy, the demand for weight savings of structural components, such as fuselage, wing and spar parts continues to increase. The aircraft industry is meeting this demand by specifying higher strength, metal parts to enable reduced section thickness as a weight savings expedient. In addition to strength, the durability and damage tolerance of materials are also critical to the fail-safe structural design of an aircraft. Such consideration of multiple material attributes for aircraft applications eventually led to today's damage-tolerant designs, which combine the principles of fail-safe design with periodic inspection techniques.

A traditional aircraft wing structure comprises a wing box generally designated by numeral 2 in accompanying FIG. 1. It extends outwardly from the fuselage as the main strength component of the wing and runs generally perpendicular to the plane of FIG. 1. Wing box 2 comprises upper and lower wing skins 4 and 6 spaced by vertical structural members or spars 12 and 20 extending between or bridging upper and lower wing skins. The wing box also includes ribs, which can extend generally from one spar to the other, or more generally ribs can be regarded as any stiffening member in the structure. These stiffening members, or stiffeners, lie parallel to the plane of FIG. 1, whereas the wing skins and spars run perpendicular to said FIG. 1 plane. During flight, the upper wing structures of a commercial aircraft wing are compressively loaded, calling for high compressive strengths with an acceptable fracture toughness attribute. The upper wing skins of today's largest aircraft are typically made from 7XXX series aluminum alloys such as 7150 (U.S. Reissue Pat. No. 34,008) or 7055 aluminum (U.S. Pat. No. 5,221,377). Because the lower wing structures of these same aircraft wings are under tension during flight, they will require a higher damage tolerance than their upper wing counterparts. Although one might desire to design lower wings using a higher strength alloy to maximize weight efficiency, the damage tolerance characteristics of such alloys often fall short of design expectations. As such, most commercial jetliner manufacturers today specify a more damage-tolerant 2XXX series alloy, such as 2024 or 2324 aluminum (U.S. Pat. No. 4,294,625), for their lower wing applications, both of said 2XXX alloys being lower in strength than their upper wing 7XXX series counterparts.

The alloy members and temper designations used throughout are in accordance with the well-known product standards of the Aluminum Association.

Upper and lower wing skins, 4 and 6 respectively, from accompanying FIG. 1 are typically stiffened by longitudinally extending stringer members 8 and 10. Such stringer members may assume a variety of shapes, including "J", "I", "L", "T" and/or "Z" cross sectional configurations. These stringer members are typically fastened to a wing skin inner surface as shown in FIG. 1, the fasteners typically being rivets. Upper wing stringer member 8 and upper spar caps 14 and 22 are presently manufactured from a 7XXX series alloy, with lower wing stringer 10 and lower spar caps 16 and 24 being made from a 2XXX series alloy for the same structural reasons discussed above regarding relative strength and damage tolerance. Vertical spar web members 18 and 26, also made from 7XXX alloys, fasten to both upper and lower spar caps while running in the longitudinal direction of the wing constituted by member spars 12 and 20. This traditional design with stiffening elements such as stringers attached to skin or web elements by fasteners is also known as "built-up" construction. Obviously, the fasteners and fastener holes along the stringers are structural weak links, for example, as preferred locations for the initiation of fatigue cracks. An alternative construction method is to make the stiffening elements integral with the web or skin. For example, in lower or upper wing skin panels, this can be accomplished by machining both the wing skin and stringers from a single thick plate or by extruding the wing skin and stringers as a single extrusion to produce an integrally stiffened panel.

This method of "integral" construction has several advantages over traditional or "built-up" construction. For one, integrally stiffened panels are less costly to make and assemble by eliminating the need for fasteners to attach the stiffening members to the web or skin. In addition, the spacing or distance between the stiffeners can be more readily optimized in an integral panel. For example, typical stringer spacing in a "built-up" structure is 5 to 6 inches in medium to large commercial aircraft. A reduction in the stringer spacing to 3.5 inches can provide a significant increase in the compressive buckling strength of an upper wing panel, for example, or the stiffness of a lower wing skin panel. Narrower spacings are not typically used in "built-up" stiffened panels because there is a trade-off between the increased performance and the additional assembly and fastener costs associated with attaching additional stringers. Finally, the addition of more fastener holes also increases the number of fatigue initiation sites increasing the likelihood that a fatigue crack will form.

Integral wing panels have been utilized in smaller aircraft such as regional jets but much less so in larger commercial aircraft due to increased damage tolerance requirements in the latter. While integral panels have fewer sites for fatigue initiation, if a crack does initiate in the web or skin for example it can continue to propagate without interruption through the stiffening members. Likewise, a fatigue crack initiating in the stiffening member can propagate into the web or skin. In a built-up structure the web and stiffeners are separate members so a crack propagating in one member need not cause the other to crack. In fact, a fatigue crack propagating in the web can be bridged by an uncracked stiffener transferring part of the skin load to the stiffener and slowing the crack. The reduced damage tolerance of an integral structure relative to a built-up structure has limited their used on larger aircraft particularly in structure predominantly loaded in tension such as the lower wing panel.

While lower and upper wing panels are specifically mentioned in the above discussion, skins or webs stiffened by stiffening members are used throughout the aircraft, for example in the fuselage and empennage. Other aircraft components such as spars and ribs can also be of built-up design and stiffening caps separated by a web. The advantages of an integral design with respect to improvements in structural performance and reduced cost and weight and its disadvantage with respect to damage tolerance is also applicable to these structures. The invention described herein provides a method for retaining the advantages of integral structure while significantly improving the damage tolerance of same.

The important desired properties for a structural components in high capacity aircraft include higher strength, better fatigue life and improved fracture toughness. Current alloys for lower wing skin members in commercial jet aircraft all lack in the property needs required for tomorrow's high capacity aircraft.

An object of the invention is to provide a method of increasing the damage tolerance of existing aluminum alloys.

A principal object of the invention is to provide an aluminum alloy and extrusion product formed therefrom, the extrusion product having improved fracture toughness and resistance to fatigue crack growth (FCG) while maintaining high strength properties, good formability and corrosion resistance.

A further object of the present invention is to provide aluminum alloy extrusion products having improved fracture toughness and resistance to fatigue crack growth for aircraft panels.

Yet a further object of the present invention is to provide aluminum alloy extrusion products and a process for producing the products while still maintaining high levels of strength. Properties that are important are bearing strength, compression strength and tensile strength.

These and other objects will become apparent from a reading of the specification and claims and an inspection of the claims appended hereto.

SUMMARY OF THE INVENTION

The present invention is directed to an extruded structural member having improved damage tolerance. The structural member comprising: at least one area having a microstructure with intentionally increased amounts of fiber texture to reduce the rate of fatigue crack growth in the extruded structural member. In a preferred embodiment, the extruded structural member is formed from a substantially unrecrystallized extrusion selected from the group consisting of 2xxx, 5xxx, 6xxx, 7xxx and 8xxx aluminum alloys. In a most preferred embodiment, the aluminum alloys are 2x24, 2x26 and 2x27 alloys.

Another embodiment of the invention is an extruded structural member having improved fatigue crack growth resistance. The structural member comprising: a base section; a stiffening section having at least one pair of structural stiffeners, the structural stiffeners being integrally formed with the base section and projecting outwardly thereof; and at least one intra-stiffener area positioned between the pair of structural stiffeners, the intra-stiffener area having a microstructure with intentionally increased amounts of fiber texture to reduce the rate of fatigue crack growth in the extruded monolithic structural member.

A third embodiment of the invention is a structural member made from rolled plate having improved fatigue crack growth resistance and damage tolerance. The structural member comprising: at least one area having a microstructure with intentionally increased amounts of fiber texture to reduce the rate of fatigue crack growth in the structural member.

BRIEF DESCRIPTION OF THE DRAWINGS

Further features, objectives and advantages of the present invention will be made clearer from the following detailed description of preferred embodiments made with reference to the accompanying drawings in which:

FIG. 14 is a perspective view showing the M(T) specimen for a constant AK FCG test where $\Delta K=15$ ksi$\sqrt{}$in;

DEFINITIONS

Figure 1:
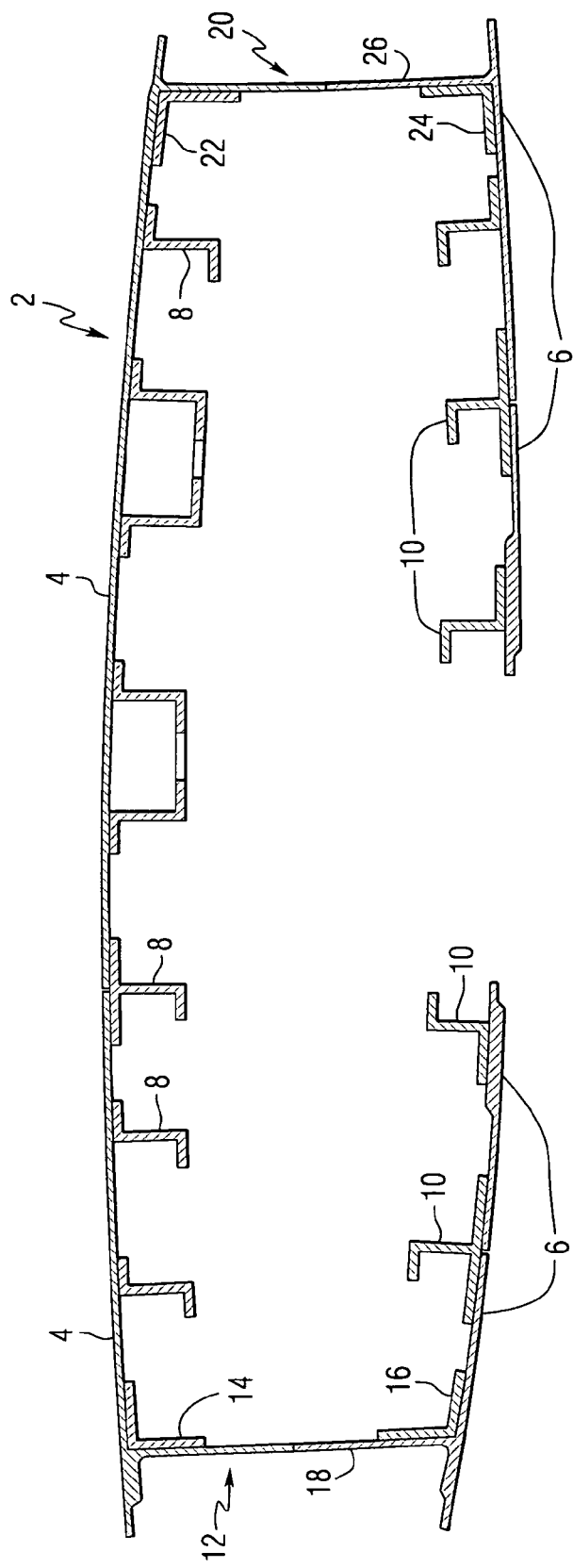
FIG. 1 is a transverse cross-sectional view of a typical wing box construction of an aircraft including front and rear spars of conventional three-piece built-up design.

For the description of preferred alloy compositions that follows, all percentage references are to weight percents (wt. %) unless otherwise indicated.

The term "ksi" means kilopounds per square inch.

The term "minimum strength" or a minimum for another property or a maximum for a property refers to a level that can be guaranteed and can mean the level at which 99% of the product is expected to conform with 95% confidence using standard statistical methods. And while typical strengths may tend to run a little higher than the minimum guaranteed levels associated with plant production, they at least serve to illustrate an invention's improvement in strength properties when compared to other typical values in the prior art.

The term "damage tolerance" is used herein to refer to the design criteria employed for engineered structures often assume that preexisting intrinsic flaws (i.e., cracks) are present, and that these flaws may exist safely in the structure provided they remain well below a critical size. This approach to design, referred to as a damage tolerant design methodology, is usually applied to structures that are susceptible to time-dependent flaw growth. However, the presence of flaws necessitates the establishment of quality inspection intervals to ensure that a critical flaw size is not reached through crack growth processes. Materials that fulfill the damage tolerant design requirements are often referred to as "damage tolerant materials". Damage tolerance design philosophy is particularly important when considering that most engineered alloys contain microstructural inhomogenities which may act as crack initiators. For structures subject to cyclic stresses, a common convention for quantifying damage tolerance is to monitor the progression of a propagating crack under cyclic loading. This approach evaluates the ability of a material to resist fatigue crack growth (FCG), and quality inspection intervals are established on this basis.

The term "substantially unrecrystallized", it is meant that the plate products of this invention are preferably 85% to 100% unrecrystallized, or at least 60% of the entire thickness of said plate products are unrecrystallized.

The term "substantially-free" means having no significant amount of that component purposefully added to the composition to import a certain characteristic to that alloy, it being understood that trace amounts of incidental elements and/or impurities may sometimes find their way into a desired end product. All preferred first embodiments of this invention are substantially vanadium-free. On a preferred basis, these same alloy products are also substantially free of, bismuth, lead and cadmium.

The expression "consisting essentially of" is meant to allow for adding further elements that may even enhance the performance of the invention so long as such additions do not cause the resultant alloy to materially depart from the invention and its minimum properties as described herein and so long as such additions do not embrace prior art.

The term "2XXX" or "2000 Series" when referring to alloys means those structural aluminum alloys with copper as the alloying element present in the greatest weight percent as defined by the Aluminum Association.

The term "2X2X" when referring to alloys means those structural aluminum alloys with copper and magnesium as the alloying element present in the greatest weight percent as defined by the Aluminum Association.

The term "ingot-derived" means solidified from liquid metal by a known or subsequently developed casting processes and includes, but is not limited to, direct chill (DC) continuous casting, electromagnetic continuous (EMC) casting and variations thereof, as well as truly continuous cast slab and other ingot casting techniques.

When referring to any numerical range of values herein, such ranges are understood to include each and every number, decimal and/or fraction between the stated range minimum and maximum. A range of about 3.6 to 4.2 wt. % copper, for example, would expressly include all intermediate values of about 3.61, 3.62, . . . 3.65, . . . 3.7 wt. % and so on all the way up to and including 4.1, 4.15 and 4.199 wt. % Cu. The same applies to all other elemental ranges, property values (including strength levels) and/or processing conditions (including aging temperatures) set forth herein.

It is believed that various aspects of this invention would also apply to military and commercial aircraft.

DETAILED DESCRIPTION OF PREFERRED EMBODIMENTS

In FIG. 1, there is shown a rough schematic illustrating the wing box 2. As described above, upper and lower wing skins, 4 and 6 respectively, are typically stiffened by longitudinally extending stringer members 8 and 10. Such stringer members may assume a variety of shapes, including "J", "I", "L", "T" and/or "Z" cross sectional configurations. These stringer members are typically fastened to a wing skin inner surface as shown in FIG. 1, the fasteners typically being rivets. It should be remembered at all times that FIG. 1 is merely a schematic representation of a wing and not a scale or detailed drawing of any commercial jet aircraft component part.

Figure 16:
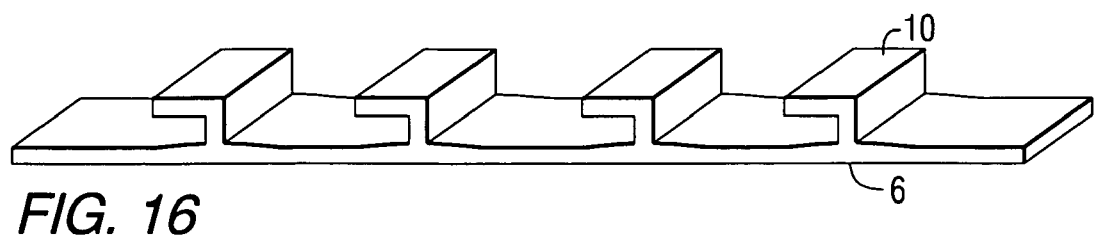
FIG. 16 is a perspective view of an integrally stiffened panel for a center wing box.

Integrally stiffened members for example members 10 in FIG. 16, can be fabricated by extruding to near net shape. Surprisingly, the damage tolerance of these structural components can be increased if these stiffening shapes are fabricated by a.) intentionally extruding oversized local geometries which promote primarily axisymmetric metal flow during extrusion and then b.) removing excess metal in these local geometries. The oversized local geometries which promote primarily axisymmetric metal flow are geometries selected from the group consisting of circles, squares, polygons and irregular shapes with aspect ratio within the range of about 0.5 to about 2.0. These local geometries having a substantially unrecrystallized microstructure with intentionally increased amounts of fiber texture.

After extrusion excess metal (in excess of the metal needed to form the desired cross section) is removed to form the desired cross-section. The excess metal is then removed by means of machining, chemical milling, laser ablation or other techniques known in the art. After the metal is removed, the extrusion has a shape that is normally obtained by extruding to near net shape. It is counter intuitive to add extra metal that is intended to be discarded or machined and thereby increase scrap.

Unexpectedly, the increased amount of amount of <100> and <111> fiber components in these local geometries, locally reduce the rate of fatigue crack growth. The improvement in damage tolerance has been demonstrated in 2x2x alloys and it is expected that similarly extruded and machined structural member fabricated from a substantially unrecrystallized extrusion selected from the group consisting of 2xxx, 5xxx, 6xxx, 7xxx and 8xxx alloys will also exhibit an increase in damage tolerance.

The damage tolerance of AA alloys 2026 and 2027 are believed to be especially sensitive to the amount of <100> and <111> fiber components. Without wishing to be bound by any theory, it is believed that the tighter control on the levels of iron and silicon in 2026 as compared to 2024 is in part responsible for the increased damage tolerance of 2026 with increased amount of <100> and <111> fiber components. The composition of a variety of similar 2xxx alloys are shown below in Table 1:

TABLE 1

| Designation | Si | Fe | Cu | Mn | Mg | Cr | Zn | Ti | Zr |
|---|---|---|---|---|---|---|---|---|---|
| 2024* | 0.50 | 0.50 | 3.8–4.9 | 0.30–0.9 | 1.2–1.8 | 0.10 | 0.25 | 0.15 | — |
| 2124* | 0.20 | 0.30 | 3.8–4.9 | 0.30–0.9 | 1.2–1.8 | 0.10 | 0.25 | 0.15 | — |
| 2224* | 0.12 | 0.15 | 3.8–4.4 | 0.30–0.9 | 1.2–1.8 | 0.10 | 0.25 | 0.15 | — |
| 2324* | 0.10 | 0.12 | 3.8–4.4 | 0.30–0.9 | 1.2–1.8 | 0.10 | 0.25 | 0.15 | — |
| 2026* | 0.06 | 0.07 | 3.6–4.3 | 0.3–0.8 | 1.0–1.6 | — | 0.10 | 0.06 | 0.05–0.25 |
| 2027* | 0.12 | 0.15 | 3.9–4.9 | 0.5–1.2 | 1.0–1.5 | — | 0.20 | 0.08 | 0.05–0.15 |

*Others: each 0.05, total 0.15
Note:
Where a range is indicated, the range indicates a min and max. Where a single number is indicated, the single number indicates a max.

In addition, it is believed that the presence of zirconium in 2026 is in part responsible for the unrecrystallized grain microstructure, which promotes better damage tolerance. In conjunction with the invention, the damage tolerance of 2026 increases unexpectedly. Therefore, 2027 is very likely to have a pronounced increase in damage tolerance when used as the alloy in fabricating structural parts of the present invention.

The invention is particularly useful in the aerospace industry for designing structural components for which damage tolerance is a primary consideration. The improved resistance to fatigue crack initiation and fatigue crack growth, FCG, allow for longer periods between inspections or higher operating stresses, which reduce aircraft weight. In addition, the invention allows for aircraft designers to incorporate monolithic (unitized) design, thereby reducing the number of aircraft parts and subsequent costs associated with aircraft manufacture and maintenance, without increasing the weight of the aircraft.

Representative structural component parts include extruded stiffening members, extruded spar members, integrally stiffened panels and monolithic spar members and the like that are extruded or machined from thick wrought sections, including rolled plate. Such stiffening and spar members can be used in the wingbox, fuselage and empennage structures of high capacity aircraft, or in any application of the aircraft where damage tolerance is critical to design and certification.

The present invention is particularly suitable for manufacturing high strength extrusions and forged aircraft components, such as, for example, main landing gear beams. Such aircraft include commercial passenger jetliners, cargo planes (as used by overnight mail service providers) and certain military planes. To a lesser degree, the alloys of this invention are suitable for use in other aircraft including but not limited to turbo prop planes. In addition, this invention is applicable to the production of any structural member or application in which damage tolerance is a critical design property.

Conventional melting and casting procedures are employed to formulate the alloy. Care must be taken to maintain high purity in the aluminum and the alloying constituents so that the trace and impurity elements, especially iron and silicon, are at or below the requisite maximums. Ingots are produced from the alloy using conventional procedures such as semi-continuous direct chill casting. Once the ingot is formed, the alloy must not undergo a conventional homogenization, for example, by subjecting the ingot to elevated temperature of about 915° F. (490° C.). The conventional homogenization treatment, while entirely adequate for providing an essentially uniform distribution of alloying elements, results in a coarse distribution of dispersoids.

In similar 2XXX alloys, the alloying element Mn is mostly in supersaturation after ingot casting. During homogenization, Mn undergoes a solid state reaction and forms dispersoid particles of approximate stoichiometry $Al_{20}Cu_2Mn_3$. These dispersoids can inhibit recrystallization when present in high number density by pinning recrystallization nuclei in early stages of recrystallization via a metallurgical process called Zener drag. However, the conventional homogenization results in dispersoid distributions which are in general too coarse to inhibit recrystallization.

The alloy product is aimed at being substantially unrecrystallized. It addresses the above-described shortcomings of similar 2XXX alloys by the introduction of an additional dispersoid-forming element Zr, coupled with a well controlled homogenization treatment that balances the elemental redistribution while at the same time, provides a dense distribution of Mn-bearing dispersoids as well as an additional distribution of Zr-bearing dispersoids. The specially controlled homogenization is carried out by slowly heating the ingot over a course of about 9 hours (or longer) to a temperature between about 855° F. and 880° F. (456° C. and 471° C.) and is maintained therein for about 18 hours, followed by air cooling to room temperature.

Following the homogenization step, the alloys are cooled to room temperature at any desired rate. This cooling to room temperature is preferably air cooling. The alloys may be optionally cooled following homogenization to at least 800° F. (426.7° C.) at a rate of less than 100° F. (37.8° C.) per hour, preferably at a rate of less than 70° F. (21.1° C.) per hour. This optional slow cooling is followed by cooling of the alloys to room temperature at any desired rate. This cooling to room temperature is preferably air cooling.

After cooling the homogenized alloy to substantially room temperature, the ingot is sawed into billets of appropriate lengths and scalped. Then the billets may be reheated to an elevated temperature for extrusion. The reheat process can be carried out either by induction heating or in an air furnace. In the case of induction heating, the billet is rapidly heated to the desired extrusion temperature and extruded. The reheat temperature represents the optimum starting point for extruding the billet into the desired configuration based on producing commercially acceptable product and available press tonnage. The selection of a reheat temperature can have a major impact on the productivity and thus the profitability or an extrusion press. Reheating the billet to too low a temperature results in recrystallization during subsequent solution heat treatment and hence, lower or failing strength (depending on the specification). Reheating the billet to too high a temperature results in low extrusion speeds in order to produce acceptable product.

After the material has reached the reheat temperature, it is ready to be placed in the extrusion press and extruded. In an effort to avoid unnecessary cooling of the billet, care is taken to minimize the time it takes to transport the material from the reheat furnace to the extrusion press. The billet is placed into a heated compartment or container in the extrusion press. All of the foregoing steps relate to practices that are well known to those skilled in the art of casting and extruding. Each of the foregoing steps is related to metallurgical control of the metal to be extruded.

The billets can then be extruded. As will be described in more detail below, when hot working the alloy to produce extrusions, extreme care must be taken to prevent any substantial recrystallization or tearing of the extrusion surface. As stated above, the term "substantially unrecrystallized" means that less than about 20 vol. % of the alloy microstructure in a given product is in a recrystallized form, excepting surface layers of extrusions which often show complete recrystallization. In any event, the surface layers of extrusion products are often removed during fabrication into final part configurations. As will be described in more detail below, recrystallization (including the surface layer) can be minimized by maintaining the temperature of the alloy during hot working at levels that cause annealing out of internal strains produced by the working operation such that recrystallization will be minimized during the working operation itself, or during subsequent solution treatment.

After the alloy is extruded into a product, the product is typically solution heat treated at a temperature on the order of 920° F. (493° C.) for a time sufficient for solution effects to approach equilibrium. Once the solution effects have approached equilibrium, the product is quenched using conventional procedures, normally by spraying the product with or immersing the product in room temperature water. After quenching, extruded products may be stretched or stress relieved to develop adequate strength, relieve internal stresses and straighten the product.

Large intermetallic compounds formed during solidification, fabrication and heat treatment will lower the fracture toughness of the alloy. It is therefore most important to maintain the level of the elements which form intermetallic compounds at or below the allowable maximum set forth above. Intermetallic compounds may be formed from the major alloying elements copper, magnesium and manganese, as well as from impurity elements, such as iron and silicon. The amount of the major alloying element copper is constrained so that the maximum amount of this element will be taken into solid solution during the solution heat treatment procedure, while assuring that excess copper will not be present in sufficient quantities to cause the formation of any substantial volume of large, unwanted intermetallic particles containing this element. The amounts of the impurity elements iron and silicon are also restricted to the very low levels as previously indicated in order to prevent formation of substantial amounts of iron and silicon containing particles.

If the total of large intermetallic compounds formed by copper, magnesium, manganese, iron and silicon, such as $CuAl_2$, $CuMgAl_2$, $Al_{12}(Fe,Mn)_3Si$, $Al_7Cu_2Fe$ and $Mg_2Si$ in an alloy otherwise made in accordance with the present invention exceeds about 1.5 vol. % of the total alloy, the fracture toughness of the alloy will fall below the desired levels, and in fact may fall below the fracture toughness levels of similar prior art alloys of the 2024 type. The fracture toughness properties will be enhanced even further if the total volume fraction of such intermetallic compounds is within the range of from about 0.5 to about 1.0 volume percent of the total alloy. If the foregoing preferred range of intermetallic particles is maintained, the fracture toughness of the alloy will substantially exceed that of prior art alloys of similar strength.

The extrusion process involves a considerable amount of deformation energy. Most of this energy transforms into heat, but part of the deformation energy is stored in the material. The lower the extrusion temperature and/or the higher the extrusion speed, the higher the stored energy of deformation. The 2XXX alloys, as is the case with most aerospace aluminum alloys, require a solution heat treatment subsequent to extrusion, during which the stored energy of deformation is dissipated. For materials with a high stored energy, the stored energy dissipation manifests in the undesirable recrystallization.

Recrystallization causes the loss of the strengthening deformation texture built up during extrusion. It also changes the grain structure by replacing the low angle grain boundaries in the deformed or unrecrystallized state with high angle grain boundaries. The high angle grain boundaries are susceptible to heterogeneous precipitation during the quenching operation of the subsequent solution heat treatment. The high angle grain boundaries with heterogeneous precipitates are weak links in fracture processes and preferred sites for anodic corrosion attack. A recrystallized 2XXX product, therefore, may fail to meet certain property specifications such as strength, toughness and corrosion resistance. It is important to have an unrecrystallized structure in the product after thermal and mechanical processing so that the fiber texture is retained in the final product.

The extrusion procedure itself is controlled to minimize recrystallization in the final product and to thus maintain the strength and toughness of the product at the desired improved levels. U.S. Pat. No. 4,294,625 discloses that desired properties can be achieved if the alloy is extruded at temperatures at or above about 770° F. (410° C.) while holding the extrusion speed such that the degree of recrystallization in the final wrought product is minimized.

The extrusion conditions (speed and temperature) of hard aluminum alloys are determined empirically and kept below safe speed and temperature limits by experience to reduce the risk of impairing the quality and properties of the extruded product.

Exact extrusion speeds and temperatures are of course dependent upon such factors as starting billet size, extrusion size and shape, number of die openings, press tonnage and method of extrusion (direct or indirect). It is necessary to achieve a substantially unrecrystallized structure in the extruded product in order to obtain the desired mix of properties. The unrecrystallized structure thus produced is very beneficial to strength. An 8.8 (18%) ksi or greater differential has been noted between unrecrystallized and recrystallized structures of extrusions of the alloy. Likewise, the unrecrystallized structure is usually superior to its recrystallized counterpart in fracture toughness, as it is more difficult to propagate cracks in the finer unrecrystallized structure of the alloy in which the heterogeneously nucleated grain boundary precipitates are much finer.

Extruded products may be stretched as a final working procedure in order to straighten and strengthen the product and to remove residual quenching stresses from the product. It should be noted that the stress patterns in the cold worked alloy are reversed from those of normal solution treated and quenched material; i.e., the surface layers of the alloy are in tension and the center is in compression. Stretching a product beyond 2% to 3% up to about 8% provides a continual increase in strength. Where such increased strength is not needed, extrusions are stretched 1% to 3%, as is normally required for all commercial alloys for aerospace applications.

The benefit of the present invention is illustrated in the following examples.

EXAMPLES

Integrally stiffened members represented in shapes used in aerospace structures are fabricated by extruding to near net shape. As described in priority document of U.S. Provisional Patent Ser. No. 60/339,715, cross-referenced earlier, the variability observed in fatigue crack growth (FCG) tests of damage-tolerant extrusion alloy 2026 in the -T3511 condition was a result of the crystallographic texture that developed during processing. Two extrusion processing parameters were identified as having the most significant influence on texture evolution and subsequent FCG behavior: extrusion aspect ratio (AR) and extrusion ratio.

Figure 2:
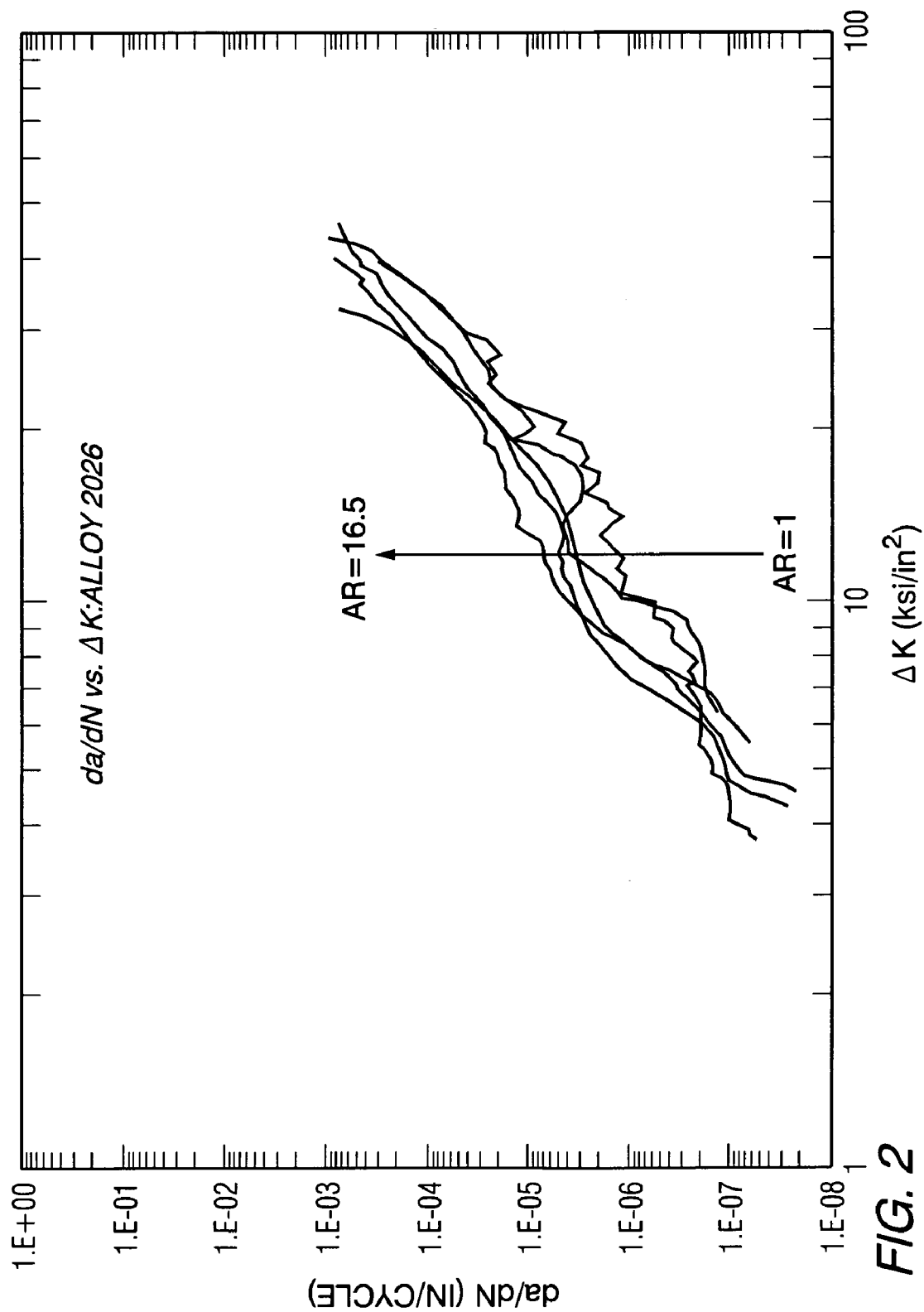
FIG. 2 illustrates fatigue crack propagation rates for Alloy 2026-T3511 extrusions of varying thickness under test conditions of R=0.1, RH>90% RT and Freq (specimen loading frequency)=25 Hz, where R=ratio minimum load applied/maximum load applied, RH=relative humidity, and RT=room temperature.

The observed effect of aspect ratio (AR), extrusion width divided by the thickness on FCG behavior is clearly illustrated in FIG. 2 for Alloy 2026. As the aspect ratio of various samples increases from unity, i.e., an extrusion with a square cross section, to values from 15 to 20, i.e. extrusions with rectangular cross-sections, the resistance to FCG (fatigue crack growth) decreases. The aspect ratios are 1, 1.7, 11.67, 15, and 16.5, and while there is some overlap, the general trend is relatively consistent. The square extrusion areas were shown to have improved FCG resistance compared to the rectangular extrusion areas. It was further shown that the crystallographic texture that developed in the square extrusions with an AR=1 was similar to that of extruded low aspect ratio (AR) aluminum rod and bar, whereas the texture measured in the extrusions with high aspect ratios (>15) was similar to that observed in rolled aluminum plate. The conclusion was that texture was the principal microstructural feature that contributed to the difference in FCG behavior, and the fiber texture characterized by the <111> and <100> crystallographic directions provided the best resistance to FCG in 2026-T3511 extrusions. Therefore, the best FCG performance for 2026-T3511 extrusions occurs when a fatigue crack grows through an area with a fiber texture, and a plane strain, rolling-type, texture provides the least resistance comparatively.

Extrusion ratio, defined as the billet cross-section area divided by the extrusion cross-section area, was identified as the second processing parameter that governed texture development and the subsequent FCG behavior. However, the effect was found to be much less significant than extrusion aspect ratio. If the extrusion ratio was significantly high (ER>15), the intensity of the texture that developed was adequate for the aspect ratio to govern FCG behavior. It should also be noted that the formation of the proper fiber texture in extrusions is also dependent upon the inhibition of recrystallization during extrusion processing. Therefore, the chemical composition and extrusion processing parameters, namely extrusion speed and temperature, must be properly controlled.

It has been found that square extrusions with a fiber texture provided the best resistance to FCG in 2026-T3511 extrusions. Initially, this discovery was merely incidental of the extrusion geometry, and therefore of no practical value since it could not be controlled. We have found that it is possible to selectively insert a fiber texture into a region of an extrusion where a fiber texture would not naturally develop. It was believed that the FCG resistance of such an extrusion would be enhanced significantly from the presence of a fiber texture. In addition to improvements in FCG, 2026-T3511 extrusions with a fiber texture exhibited improved S—N fatigue, higher strength and presumably higher toughness as well, and therefore, it was believed that by selectively tailoring the texture these properties would be enhanced too.

Targeted applications for this invention are focused on aerospace structure, both conventional and newly developing monolithic concepts. Conventional, "built-up" aluminum aerospace structure would benefit from this invention by extending the period of time required for initial damage inspection, which is based on fatigue performance. Frequently, fatigue cracks initiate around mechanically fastened joints, which increase the local stress concentration. If a fiber texture were developed in this region, the time of crack initiation would be extended, effectively increasing the period for initial inspection. Furthermore, the inspection intervals, which are established by the FCG performance, following the initial inspection could be set further apart as the fiber texture would improve the characteristic da/dN performance of the material. Therefore, the improved fatigue and FCG performance granted by selectively tailoring the texture in aerospace structure would lead to less frequent repairs and longer service life of the aircraft, both which lead to a reduction in costs associated with inspection and repairs.

Similarly, if it can be shown that the FCG resistance offered by an improved material or product is significantly better than the incumbent such that an aircraft component will experience an equivalent service life at elevated stresses, then the thickness of parts can be reduced and aircraft weight is decreased, which provides cost savings through better fuel efficiency. Furthermore, increased fracture toughness characteristics of a material allow for the presence of larger fatigue cracks before failure occurs, which provides safety inspectors additional opportunities to find and repair this damage. Therefore, the improved fracture toughness, resistance to fatigue initiation and FCG provided by aluminum products with fiber texture translate to potential cost savings in aircraft design by longer and less frequent inspection intervals and improved aircraft performance.

The impact this invention could have on new aerospace design concepts is also quite promising. More commonly, aircraft original equipment manufacturers are moving towards parts consolidation by introducing monolithic design concepts. However, moving away from built-up structure implies elimination of many of the redundant load paths that ensure fail-safe design and improve damage tolerance. A crack that initiates in the skin of a built-up lower wing structure, for example, may grow for several inches before reaching a stiffening member. Although, the wing skin has suffered severe damage, the stiffener is still intact and much of the load is transferred from the skin to the stiffener, and thus the driving force for crack growth is retarded. However, the same scenario in a monolithic lower wing skin might result in a crack that propagates through the skin and into the stiffener. The driving force for crack growth increases with the crack length, and therefore an unstable crack could develop rapidly in this scenario. Therefore, another means to provide additional FCG resistance and crack retardation is necessary to prevent damage sufficient to cause catastrophic failure in the lower wing assembly.

The results of the present invention suggest that aluminum components with improved damage tolerance from a controlled texture may provide the necessary FCG resistance that would allow adequate time to inspect for and repair large fatigue cracks before they reached a critical size.

Furthermore, it is also believed that other alloy systems and alloy families will likely benefit from this invention. The mechanical properties for many Al—Li alloys are known to be affected by crystallographic texture, and therefore, it is likely that textured extrusions with improved properties could be developed for these alloys. In addition to extrusion processing, it is also possible to control the evolution of texture in other wrought processing techniques, such as rolling.

Figure 3A:
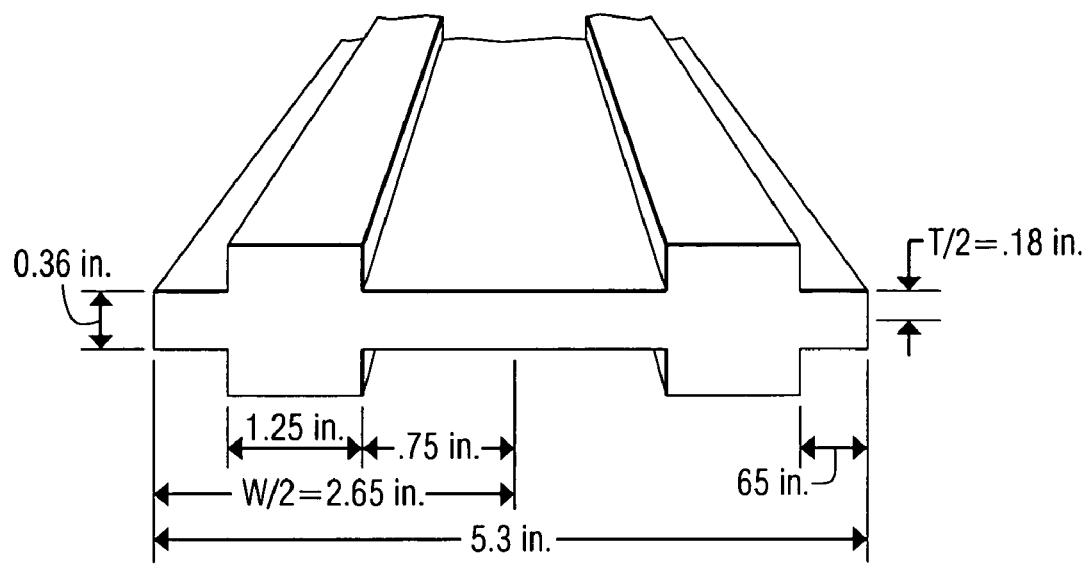
FIGS. 3A and 3B illustrate a perspective-sectional view of the test extrusion used in the examples, wherein 3A the extrusion contains two square areas imposed on a rectangular extrusion, and in 3B a cross-sectional area of a control extrusion is used in the examples.

The purpose of the current examples is to create an extrusion with a fiber texture selectively inserted in a region of the extrusion where a fiber texture would not naturally develop. A fiber texture can be created in an extrusion through the use of channel dies, feeder plates, spreader dies, two-step extrusions (or sometimes referred to as double-extrusion). In addition, a fiber texture will naturally develop in areas where the metal flow is axisymmetric, such as in thick square sections or round sections. For the current example, axisymmetric metal flow was promoted in local areas of an extrusion by inserting two square areas in the cross-section of the extrusion die that would otherwise be rectangular, as shown in FIG. 3A.

Figure 3B:
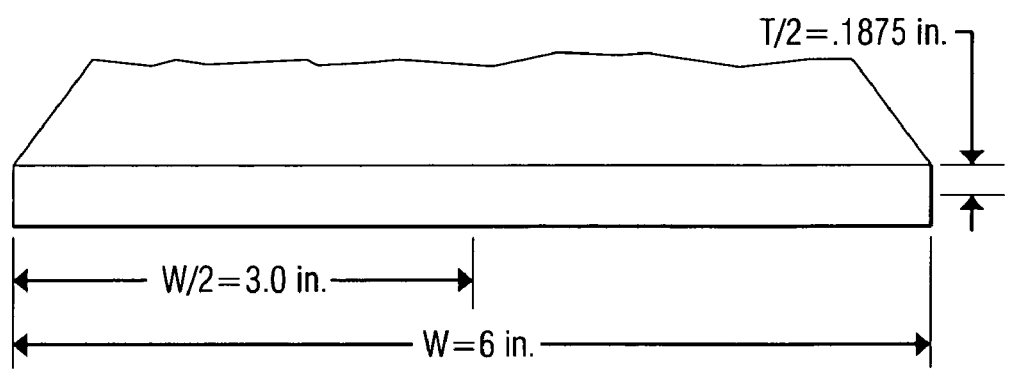

An experimental extrusion die, was designed, and finite element analysis was used to predict the metal flow and verify that the proper texture would develop. A drawing of the extrusion profile is provided in FIG. 3A, which shows two square areas imposed on a rectangular extrusion. The two square areas were inserted to produce a fiber texture. A second extrusion, illustrated in FIG. 3B, was produced as baseline for comparison, which had a simple rectangular cross section. In FIGS. 3A and 3B, T=thickness and W=width.

The extrusions were both fabricated from extruded AA2026 on an indirect press at temperatures ranging from 500° F.–800° F. (260° C.–427° C.), and a speed of 5–15 feet/minute. The extrusions were then solution heat treated at 920° F.–930° F. (493° C.–499° C.) for up to 30 minutes. The parts were then stretched 1%–3% and allowed to naturally age for 4 days.

Both extrusion were fully characterized and compared to one another. The microstructure was characterized through optical microscopy and x-ray diffraction. Mechanical properties were characterized through static and FCG tests.

Figure 4A:
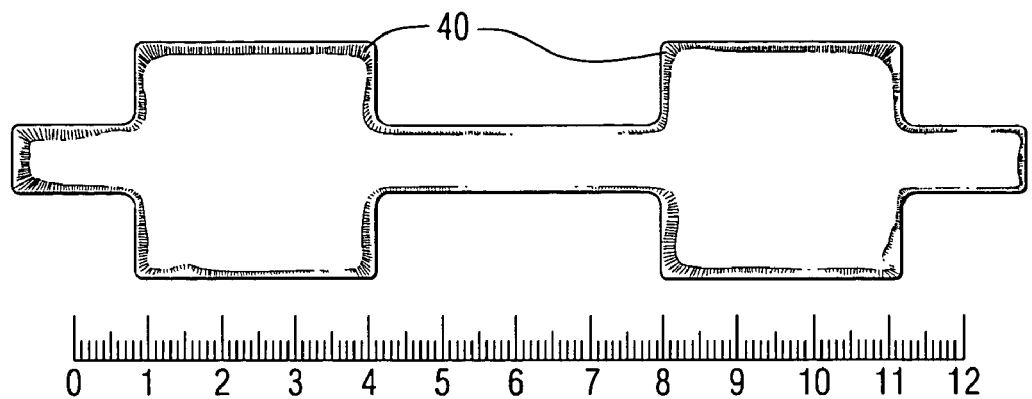
FIGS. 4A and 4B show illustrations of macro-etched cross sections of the test extrusion illustrated in FIG. 3A.
Figure 4B:
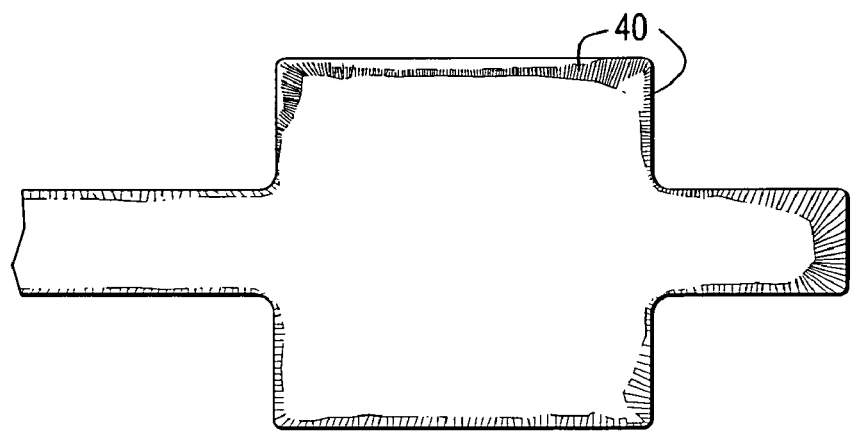
Figure 5:
FIG. 5 shows an illustration of a macro-etched cross section of the test extrusion illustrated in FIG. 3B.

The samples were macro-etched in a caustic solution to reveal the grain structure and to identify if a large amount of recrystallization had occurred. FIGS. 4A, 4B and 5 illustrate the etching. It was found that both the test extrusion and the control extrusion were primarily unrecrystallized with only minimal areas of local recrystallization 40 around the corners and edges.

Figure 6A:
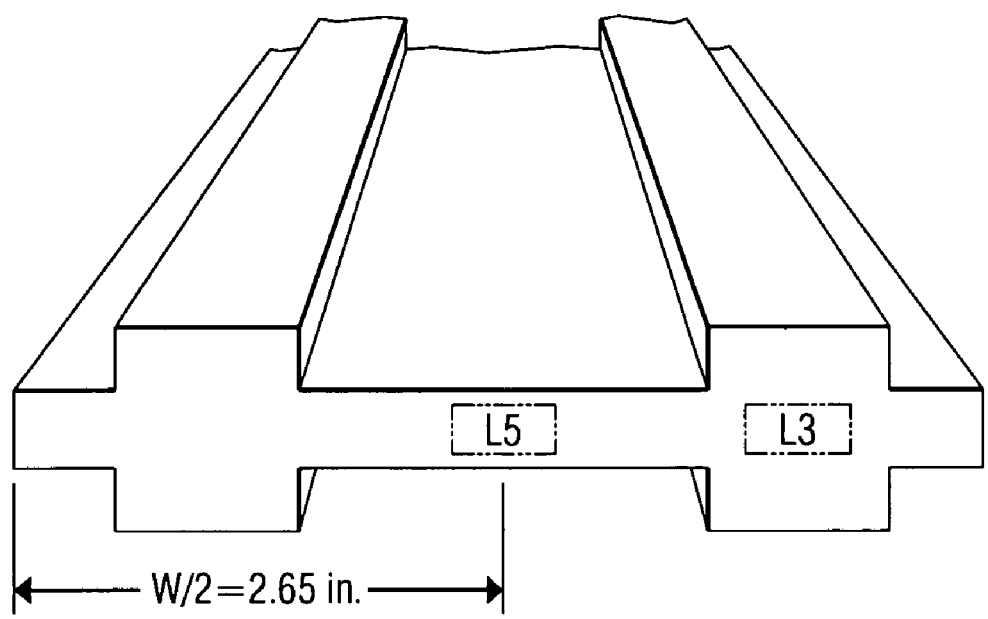
FIGS. 6A and 6B are perspective sectional views of the areas examined by light optical microscopy in the extrusions of FIGS. 3A and 3B.
Figure 6B:
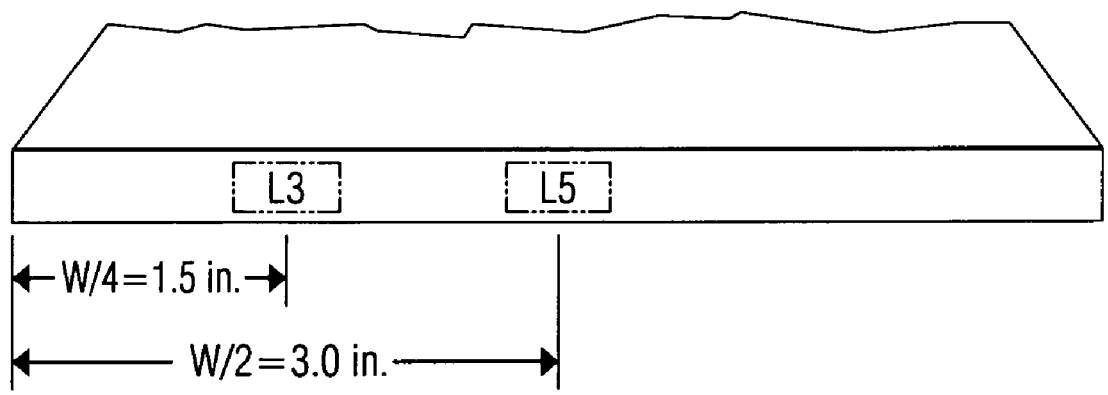
Figure 7:
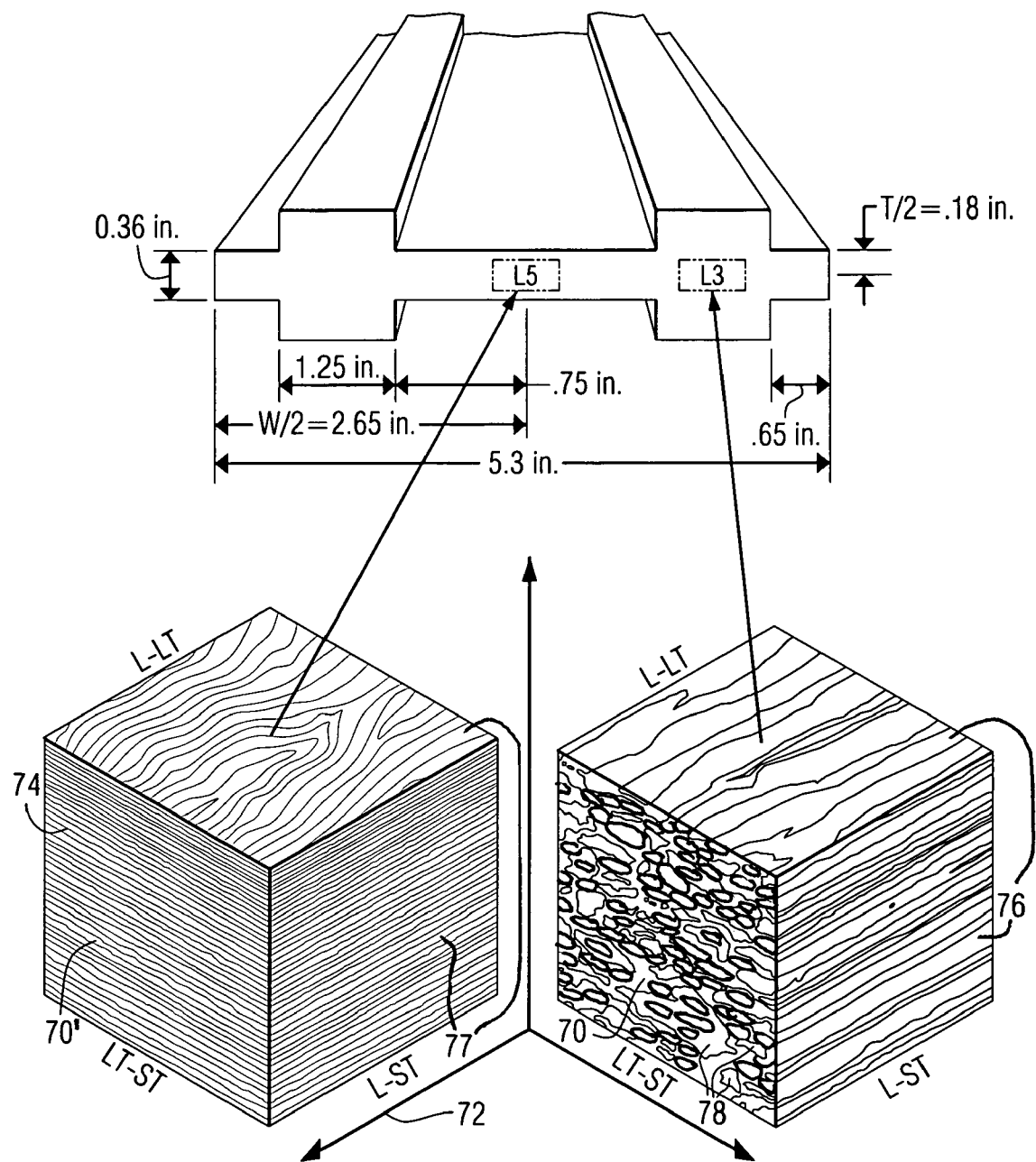
FIG. 7 is a three dimensional illustration of optical micrographs of the extrusion of FIG. 3A.

Light optical microscopy was performed on both the test extrusion and rectangular control extrusion, and three-dimensional micrographs were constructed. The areas of the extrusion that were evaluated are illustrated in FIGS. 6A and 6B. Optical micrographs for the experimental extrusion taken at locations L3 and L5 are generally shown in FIG. 7. The grains at location L3 are axisymmetric in the transverse plane 70 and highly elongated at points 76 along the extrusion axis, as shown in planes L-LT and L-ST, typical of extruded rod or bar. In contrast, the grains 74 and 70' at location L5 are flat and pancake like and highly elongated as shown by points 77 along the extrusion axis 72, which is typical of rolled aluminum plate. Both the "rod" or "fiber"-like grains of L3 and the flat pancake grains of L5 are indicative of the local extrusion geometry due to the constraint these geometries place on metal flow through the extrusion die. It is therefore not surprising that resultant grain dimensions would be indicative of the local extrusion geometry.

Figure 8:
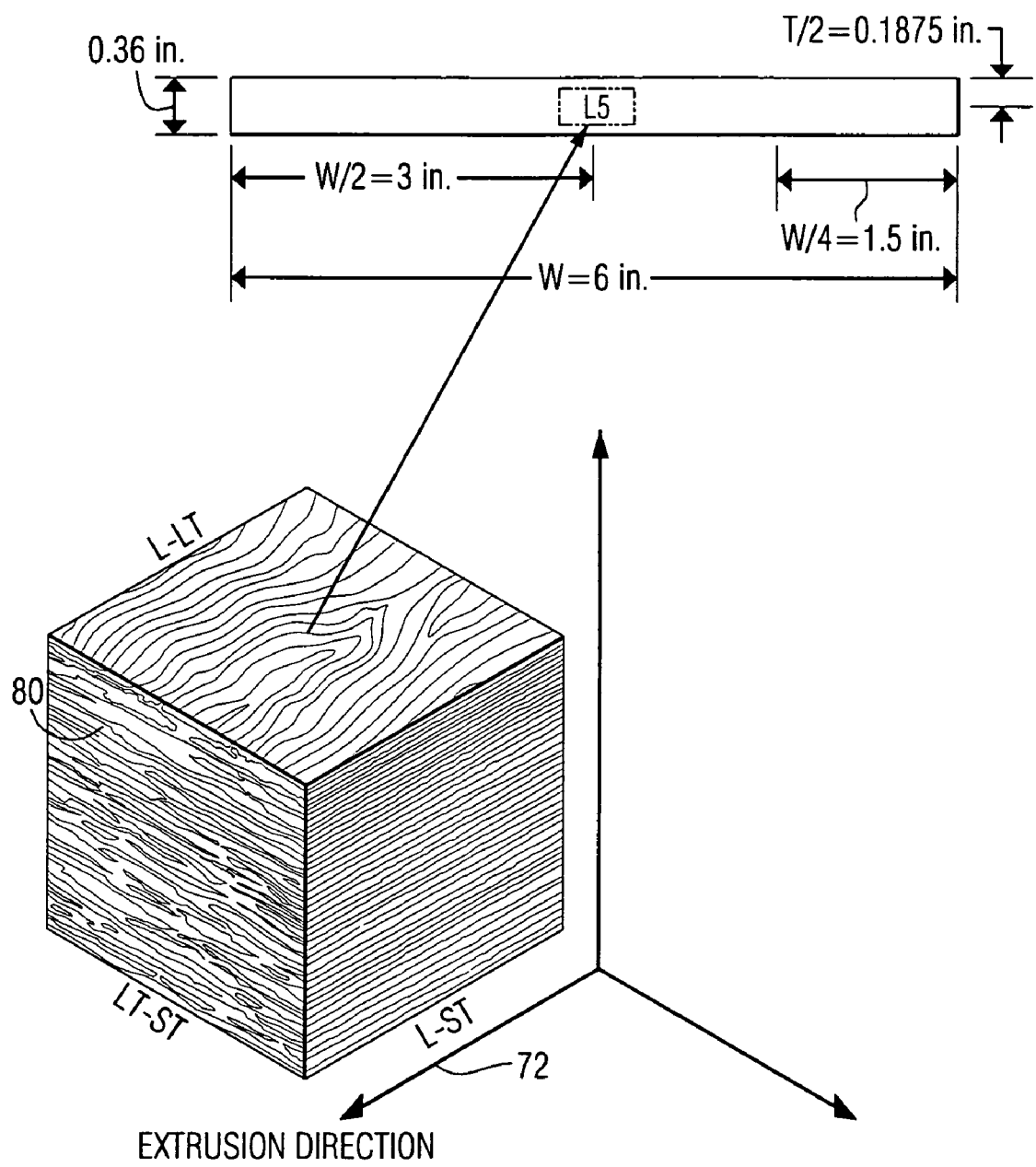
FIG. 8 is a three dimensional illustration of a light optical micrograph of all three planes taken from areas as indicated from extrusion of FIG. 3B, anodized.

The grain shapes observed in FIG. 8 of the 6×0.375 in. extrusion at location L5 are similar to those at L5 in extrusion of FIG. 7, and the grain structure is flat and pancake like, as shown at 80, and highly elongated along the extrusion direction and consistent throughout. Considering that the local geometry at location L5 in extrusion of FIG. 8 is flat and rectangular, it is, therefore expected that the rectangular extrusion would have flat pancake-like grains in all locations.

Figure 9A:
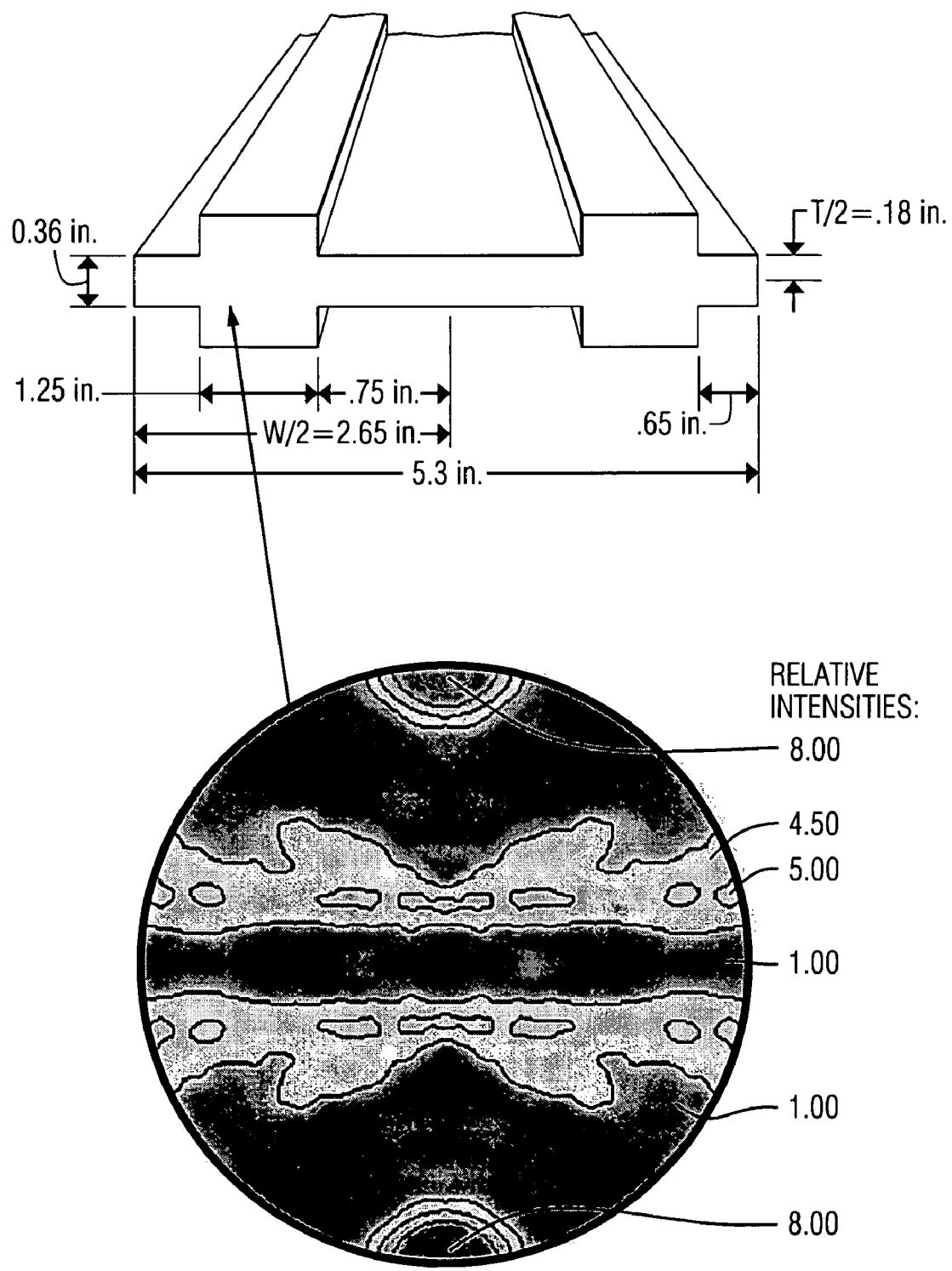
FIGS. 9A and 9B are texture measurements represented through (111) pole figures showing: fiber texture in extrusion of FIG. 3A; and rolling-type texture of extrusion of FIG. 3B respectively.
Figure 9B:
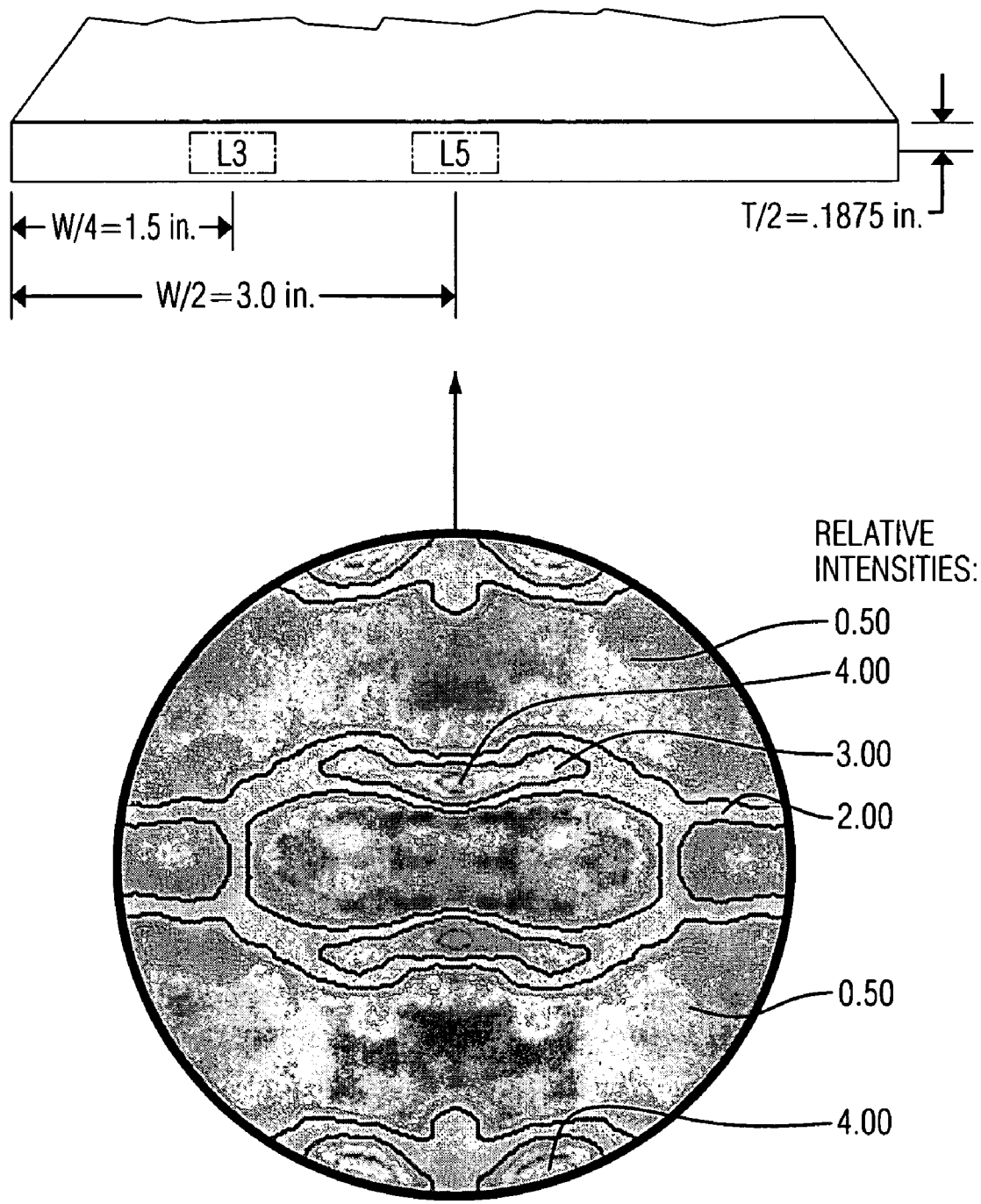

Texture measurements were performed on the extrusion of FIG. 3A and the rectangular extrusion of FIG. 3B. Texture measurements were taken from the locations indicated in FIGS. 9A and 9B, where relative intensities of preferred crystallographic orientations are shown. The data from the texture measurements from the extrusions are provided schematically as (111) pole figures, and the data show that extrusion of FIG. 3A has a fiber texture within the square region and the 6.0×0.375 in. rectangular extrusion has a rolling-type texture. The texture results are quantified in Table 2 following, and the volume fractions of the individual components for each texture are provided. In addition to the experimental extrusion and the rectangular extrusion, the data from the 4.85×4.85 in. square and 18.5×1.125 in. rectangular extrusion are provided for reference. The latter two extrusions, the square and rectangular extrusion, were examined previously, and they represent a nearly ideal fiber and rolling-type texture, respectively.

TABLE 2

Texture Components present in the various extruded shapes represented as volume fractions (%) of total crystallographic orientations

| Alloy | Shape | Fiber Component Excess | | Rolling Component Excess | | |
|---|---|---|---|---|---|---|
| | | <111> | <100> | α-brass | Cu | S |
| 2026-T3511 | 4.85 × 4.85 in. | 28.77 | 0.5 | — | — | — |
| 2026-T3511 | 18.5 × 1.125 in. | — | — | 6.11 | 2.82 | 5.93 |
| 2026-T3511 | Z-1817 (square area) | 15.16 | 7.56 | | | |
| 2026-T3511 | 6.0 × 0.375 in. | | | 7.18 | 1.37 | 5.5 |

The data in Table 2 shows that there is a strong intensity of <111> and <100> fiber components in the 4.85×4.85 in. square extrusion and in the square area of extrusion of FIG. 3A. The data also show that the beta, copper and S components, indicative of rolled aluminum sheet and plate, are present in the two rectangular extrusions. These data are consistent with the optical micrograph analysis, as well.

Mechanical Properties:

Mechanical tests were performed to compare the mechanical properties between the experimental extrusion of FIG. 3A, and the rectangular extrusion of FIG. 3B.

Figure 10A:
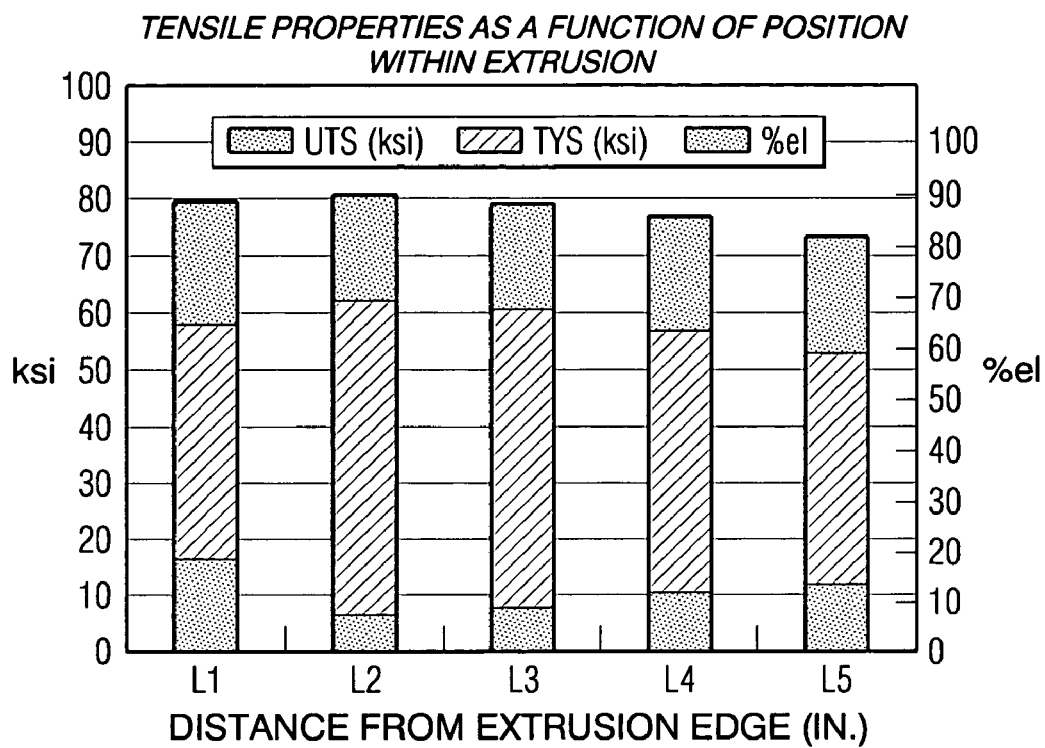
FIG. 10A is a series of bar graphs showing tensile properties of extrusion, at points shown in FIG. 10B with corresponding locations for the extrusion of FIG. 3A.
Figure 10B:
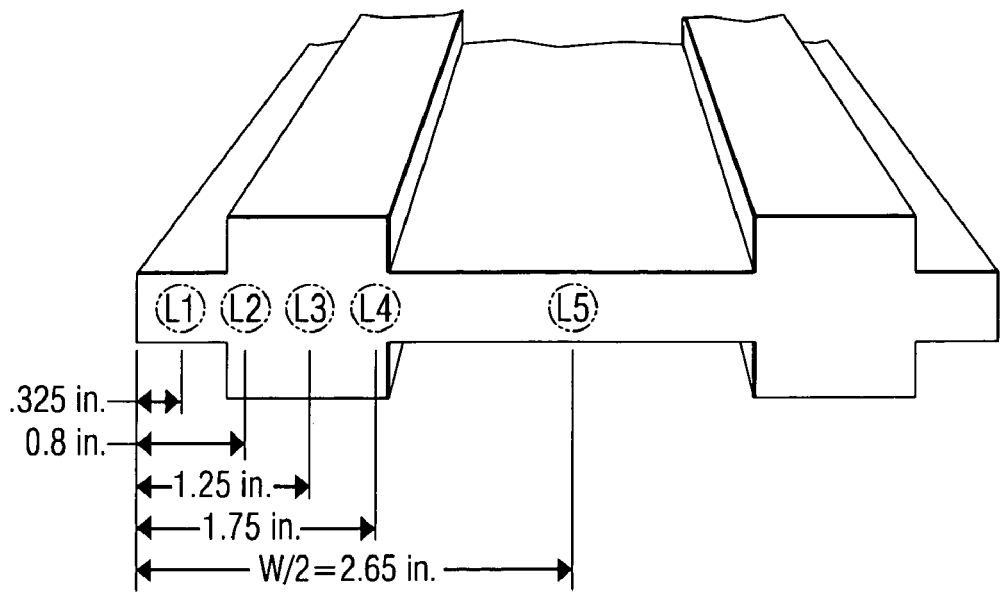
Figure 11A:
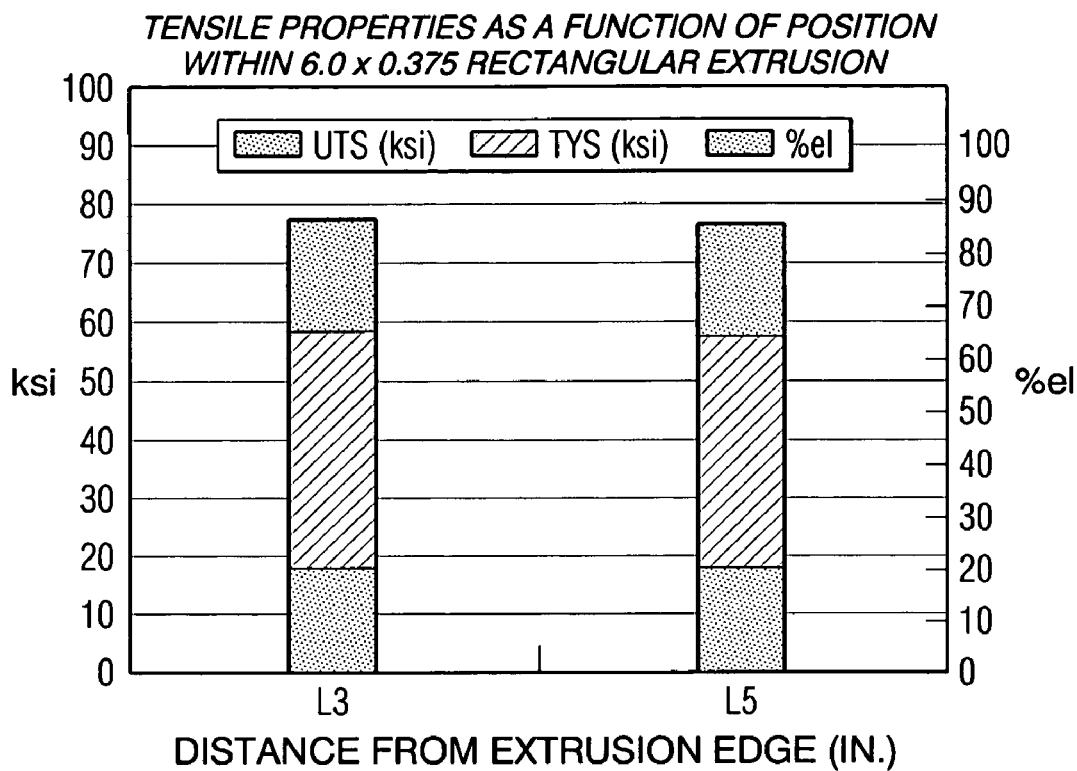
FIG. 11A is a series of bar graphs showing tensile properties for extrusion, at points shown in FIG. 11B with corresponding locations, for the extrusion of FIG. 3B.
Figure 11B:
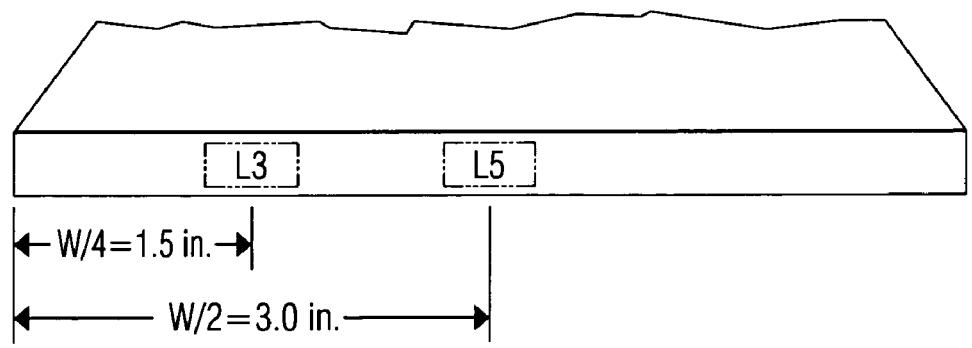

Tensile Results:

Tensile tests were performed at various locations along the cross-section of the extrusions according to FIGS. 10A and 10B. These locations indicate the change in strength as a function of the type of texture that developed. Locations L2 and L3 are regions with the strong fiber texture, and consequently they have the highest values of strength, UTS (Ultimate Tensile Strength) 80 ksi. Whereas, the flat thin section with a rolling-type texture has the lowest strengths with a UTS of only 74 ksi. The increase in strength exhibited in the fiber region is expected, and the rest of the extrusion maintains strength properties comparable to other extrusions, i.e., the fiber texture increases the strength locally without degradation in the other areas. In FIGS. 11A and 11B, the tensile properties of the rectangular shape are provided, and they are roughly constant throughout the cross-section and are equal to the lower bound properties of the FIG. 3A extruded shape. A UTS of roughly 76 ksi was measured across the rectangular shape of FIG. 3B, and the lowest UTS measured for shape of FIG. 3A at location L5 of FIG. 10B was 74 ksi. Therefore it can be concluded that the fiber texture in the extrusion of FIG. 3A extruded shape improved the tensile strengths locally with no degradation in strength in the other areas.

Figure 12:
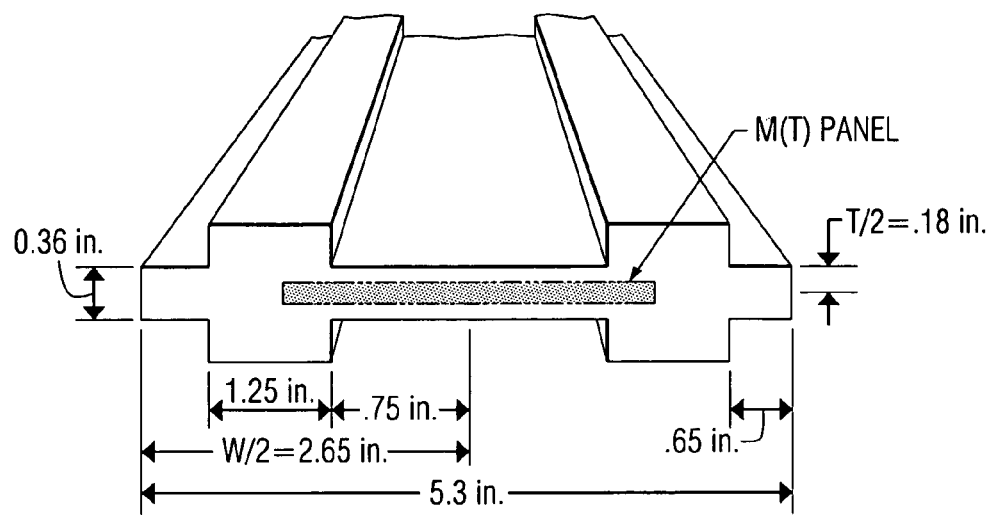
FIG. 12 shows the location of a M(T) panel specimen for constant load Fatigue Crack Growth (FCG) tests in the extrusion of FIG. 3A.
Figure 15:
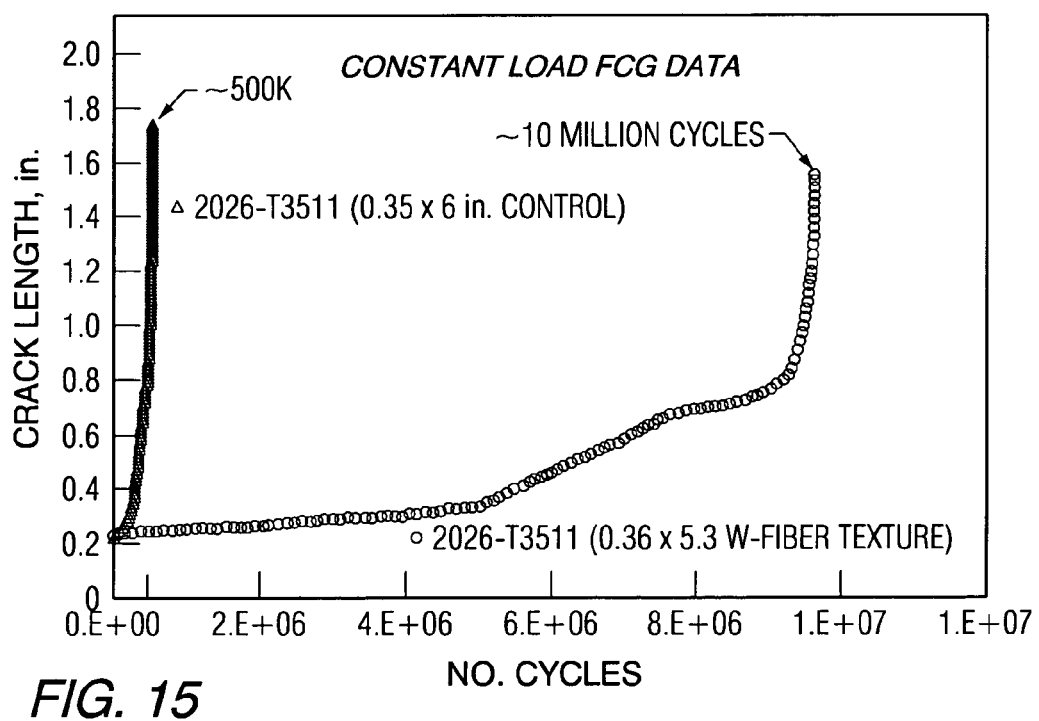
FIG. 15 is a chart showing the FCG results of for constant load (8300 lbs.) tests in the extrusions of FIGS. 3A and 3B.

Fatigue Crack Growth Results:

Constant load and constant stress intensity range, ΔK, fatigue crack growth (FCG) tests were performed on the Alloy 2026-T3511 extrusions. The constant load tests were performed on 4 in. wide and 0.25 in. thick M(T) specimens sectioned from the extrusion with the starter notch centered within the cross section of the extrusion as shown in FIG. 12. A cyclic load alternating between a maximum of 8330 lbs and a minimum of 833 lbs was applied to both samples, and the results from these tests are plotted as crack length, versus the number of applied cycles, in FIG. 15. The rectangular extrusion of FIG. 3B failed after 500,000 cycles, whereas extrusion of FIG. 3A did not fail until almost 10,000,000 cycles; more than an order of magnitude of improvement. Thus, it can be concluded that the FCG resistance of the textured extrusion of FIG. 3A was significantly improved over the baseline rectangular extrusion of FIG. 3B. It should also be noted that the same size FCG sample was employed for both extrusions, therefore the differences in life are not indicative of the extrusion size, but only of the inherent resistance to FCG of the material.

Figure 13:
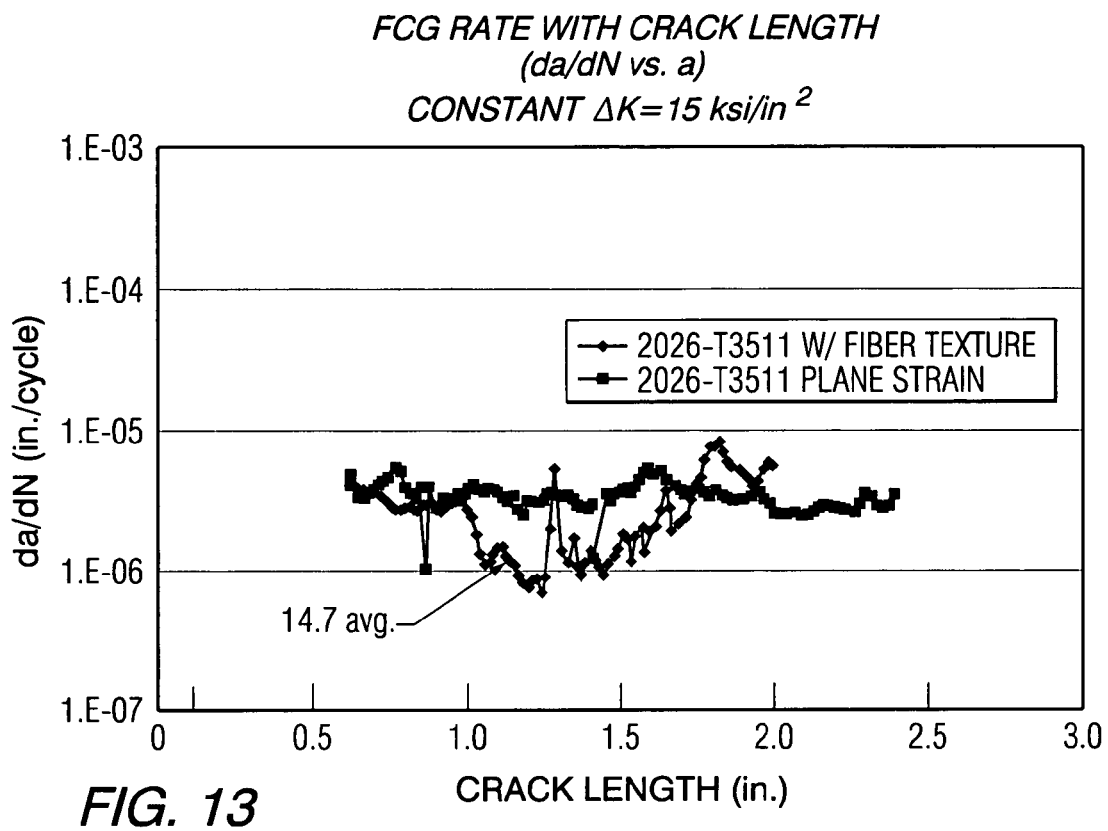
FIG. 13 is a graph showing constant $\Delta K$ FCG tests of the textured extrusion of FIG. 3A and rectangular control shape.
Figure 14:
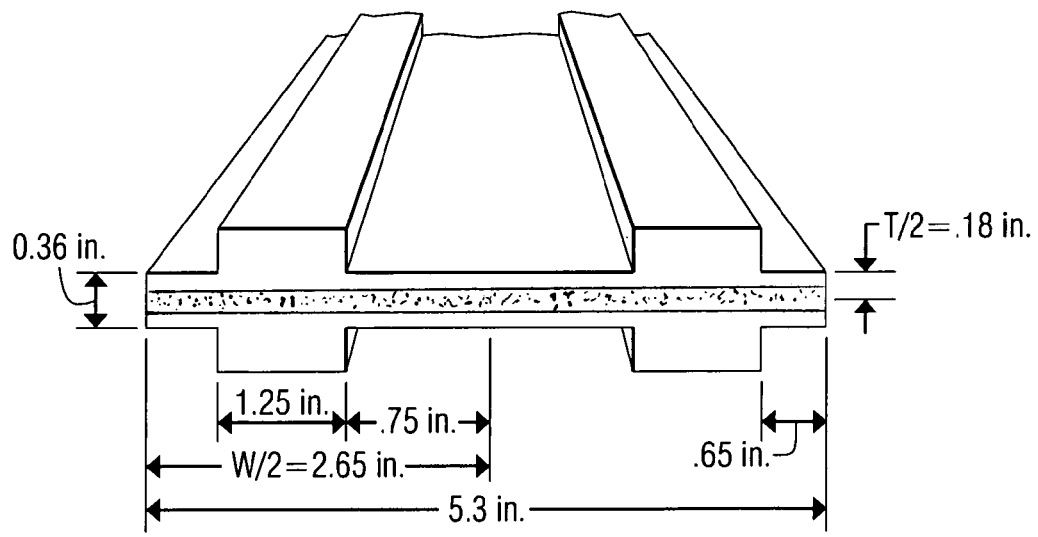

The constant $\Delta K = 15$ ksi$\sqrt{\text{in}}$ FCG tests were performed on M(T) panels, which were the full width, 5.3 in., of the extrusion of FIG. 14, which is inserted here for simplicity and is a duplicate shape of FIG. 3A. In these tests, the load is adjusted as the crack extends to maintain a constant $\Delta K$. Under these conditions, the growth rate, da/dN, is expected to remain essentially constant in a homogenous material. The results from these tests are plotted in FIG. 13 with crack growth rate, da/dN, as a function of the crack length. The FCG rates measured on the rectangular extrusions were relatively constant at roughly $5 \times 10^{-6}$ in/cycle and did not significantly change as the crack length increased. However, the FCG rates measured for the extrusions with the fiber texture were not constant. The initial rate of fatigue crack propagation for the extrusion of FIG. 3A was equivalent to the rectangular extrusion of FIG. 3B. But, as the fatigue crack grew outwards from the center of the extrusion, the rate of propagation decreased dramatically as the crack approached the region with a fiber texture. The FCG rate reached a minimum of $7 \times 10^{-7}$ in/cycle, which is about 7× slower relative to the rectangular extrusion. The crack growth rate increased as the crack left the region with the fiber texture and approached the rate initially measured. It can therefore be concluded that selectively inserting a fiber texture into an extrusion significantly improves the FCG resistance.

Based on these findings it can conclusively be determined that inserting a fiber texture in given areas of an extrusion significantly improves strength, FCG resistance and resistance and resistance to fatigue initiation. In addition, there is no decrease in other properties such as corrosion resistance, formability or any other properties required by structural metals for aerospace or other applications.

As this technology has been identified as having benefit for aerospace applications, particularly in monolithic structure, a computer analysis was performed to illustrate the benefit in FCG resistance that might be expected for a particular application. The application selected was an integrally stiffened panel for lower wing applications. The FCG resistance of alloy 2026-T3511 was modeled using a FASTRAN analysis, and typical FCG curves were generated for an extrusion having both a rolling-type texture and a fiber texture.

Figure 17:
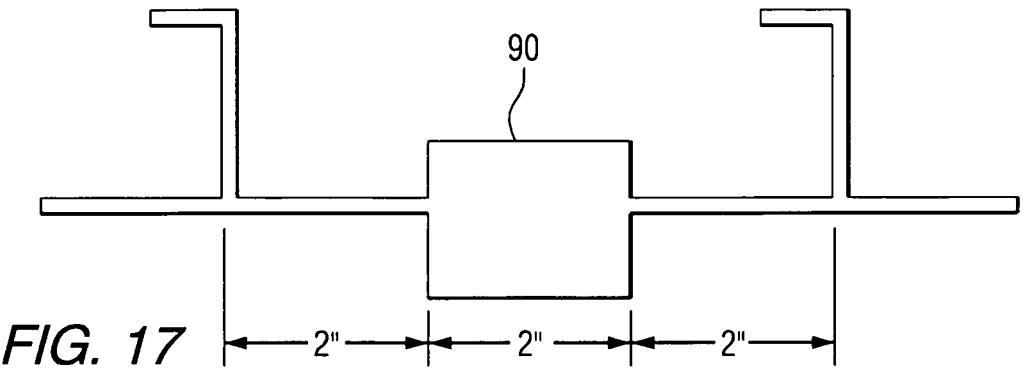
FIG. 17 is schematic view of a cross section of an integrally stiffened panel for center wing box with 6 inch spacing showing the placement of an intentionally extruded local square section, which promotes primarily axisymmetric metal flow.
Figure 18:
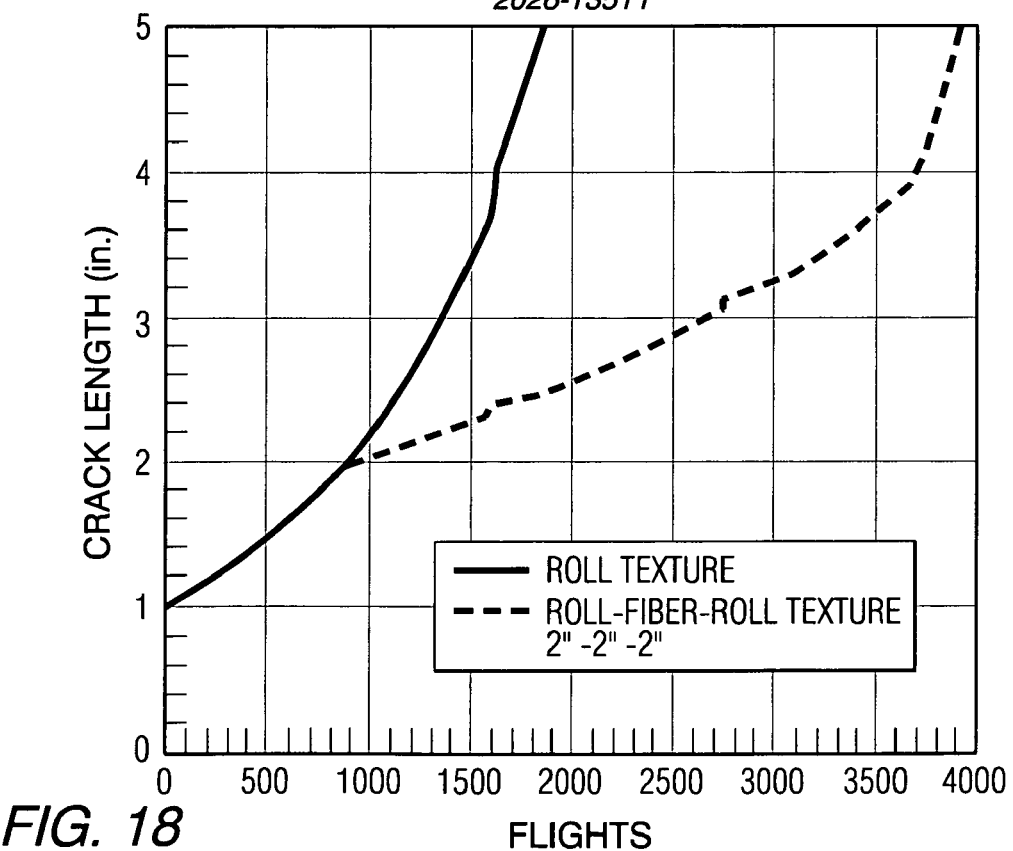
FIG. 18 is a graph of predicted life of an integrally stiffened panel fabricated with both conventional extrusion techniques and with fiber texture for improved FCG resistance of the present invention.

After the typical FCG curves were produced for the different textures they were applied to the integrally stiffened panel, FIG. 16, having wing skin 6 and extending member 10, for which the driving force for crack growth as a function of crack length is known. The first analysis, identified as Roll Texture, assumed a rolling type texture was present in all areas of the extruded ISP. The results from this analysis, identified as Roll Texture, are provided in FIG. 18, which shows the crack length as a function of the number of flights. A second analysis was performed on the same integrally stiffened panel with the same geometric configuration, but in the second analysis it was assumed that a fiber texture was selectively inserted in the skin region midway between the two stiffening members. Again, the configuration of the panel is provided in FIG. 16, and an illustration of how a fiber texture may be inserted into this shape to improve the FCG performance is given in FIG. 17. In FIG. 17, the region where the square intra-stiffener members 90 are inserted would be machined away after extrusion to provide FIG. 16, but the fiber texture would remain. The predicted life of this panel provided that a crack initiated near one of the stiffeners, identified as Roll-Fiber-Roll Texture, is provided in FIG. 18. As the crack grows for the first two inches, the FCG rates and therefore the a vs N curve for the two analyses are identical. However, as the crack approaches the fiber region embedded in the second analysis, the crack begins to slow, which is illustrated in the a vs. N curve.

The improvement in FCG resistance provided by the intentionally textured extrusion results in a total life of 4,000 cycles, compared to only about 2,000 cycles for the panel fabricated by conventional extrusion. These results are not absolute, but the trends that are provided are valuable. It can be concluded from these results that an integrally stiffened panel fabricated with a fiber texture intentionally inserted would gain a significant amount of resistance to FCG, and therefore the FCG life of the panel would increase.

Figure 19:
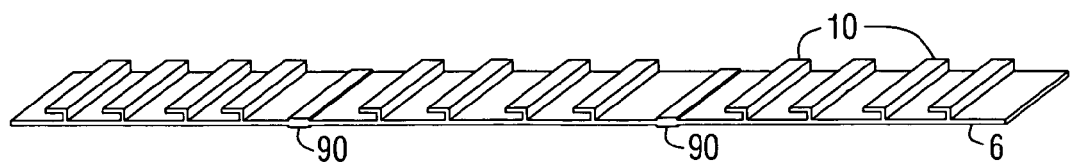
FIG. 19 is a perspective schematic view of a friction stir welded integrally stiffened panel.
Figure 20:
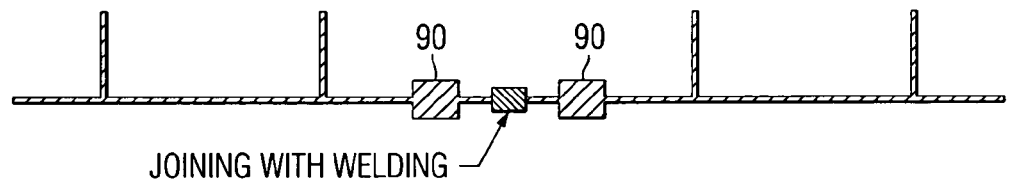
FIG. 20 is a schematic view of how a fiber texture may be inserted into welded stiffened panels for improved damage tolerance.

In addition to individual panels, this technology could also be used to improve the FCG performance of welded panels to increase damage tolerance and enable monolithic designs in aerospace applications. In FIG. 19, a rendering of a friction stir welded integrally stiffened panel is shown, and FIG. 20 shows how these panels might be fabricated to stop cracks that initiate from within the weld zones from progressing throughout the rest of the structure so rapidly. Friction stir welding, laser welding and other welding techniques can be used with the present invention.

Figure 21:
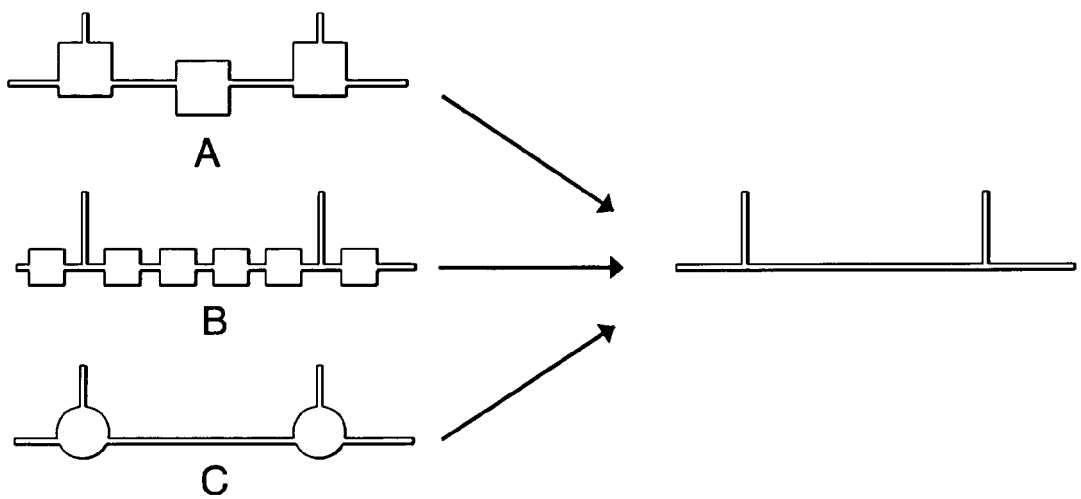
FIG. 21 illustrates the placement of three different sets of local geometries which promote primarily axisymmetric metal flow in an integrally stiffened panel.
Figure 22:
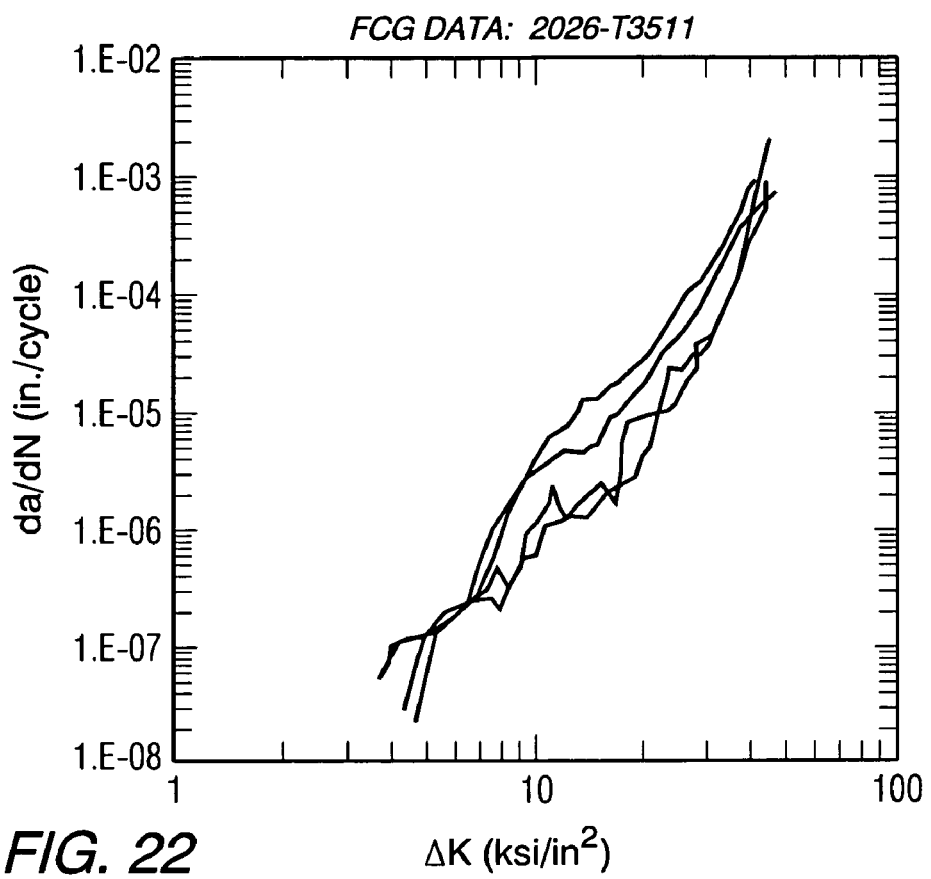
FIGS. 22–26 and 28 are graphs showing FCG data for a series of square and rectangular sections of Alloy 2026-T3511, 2024-T3511 and 2224-T3511 under test conditions of R=0.1, RH>90% RT and Freq=25 Hz.

FIG. 21 illustrates the placement of three different sets of local geometries which promote primarily axisymmetric metal flow. In 'A', these local geometries are square shaped and they are located around the stiffening members and in the intra-stiffener area. In 'B', the local geometries are used to create texture in the panel. A plurality of geometries are used to create areas in which fatigue crack growth rates are retarded. In 'C', circular cross-sectional geometries are used to create fiber texture in the base of the stiffening members and the area of the panel surrounding the stiffeners. In each case, the excess metal is removed to produce the same structure shape.

2026-T3511, 2024-T3511 and 2224-T3511 extrusions were fabricated with a square cross section (with a fiber texture) and rectangular cross sections (with a rolling type texture). The FCG curves are shown in FIGS. 22–26 and 28.

It was discovered during FCG testing of these shapes that 2026-T3511 extrusions with a square cross-section provided the best resistance to FCG when compared to extrusions with a rectangular cross-section. These results are provided in FIG. 22 and are quantified below in Table 3. The actual improvement in FCG resistance can be calculated by comparing the FCG rates of different samples at a given value of $\Delta K$.

Figure 23:
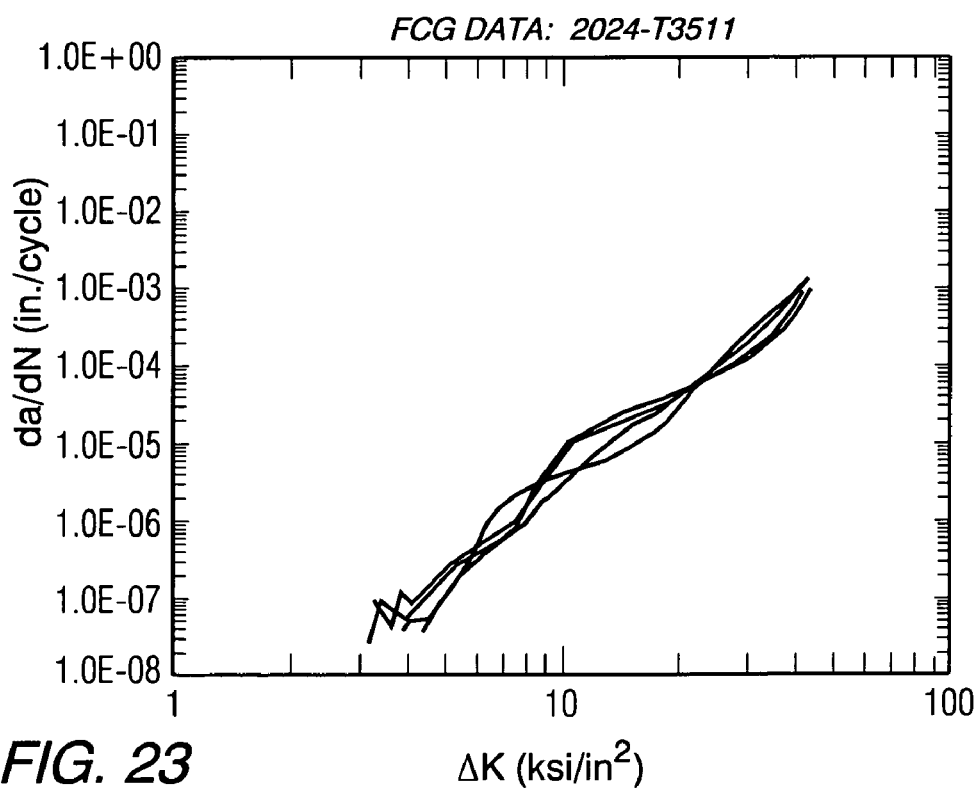

The FCG curves in FIG. 23 show there is little difference in FCG properties between the square and rectangular shapes, and therefore texture likely does not have the same effect on 2024.

Figure 24:
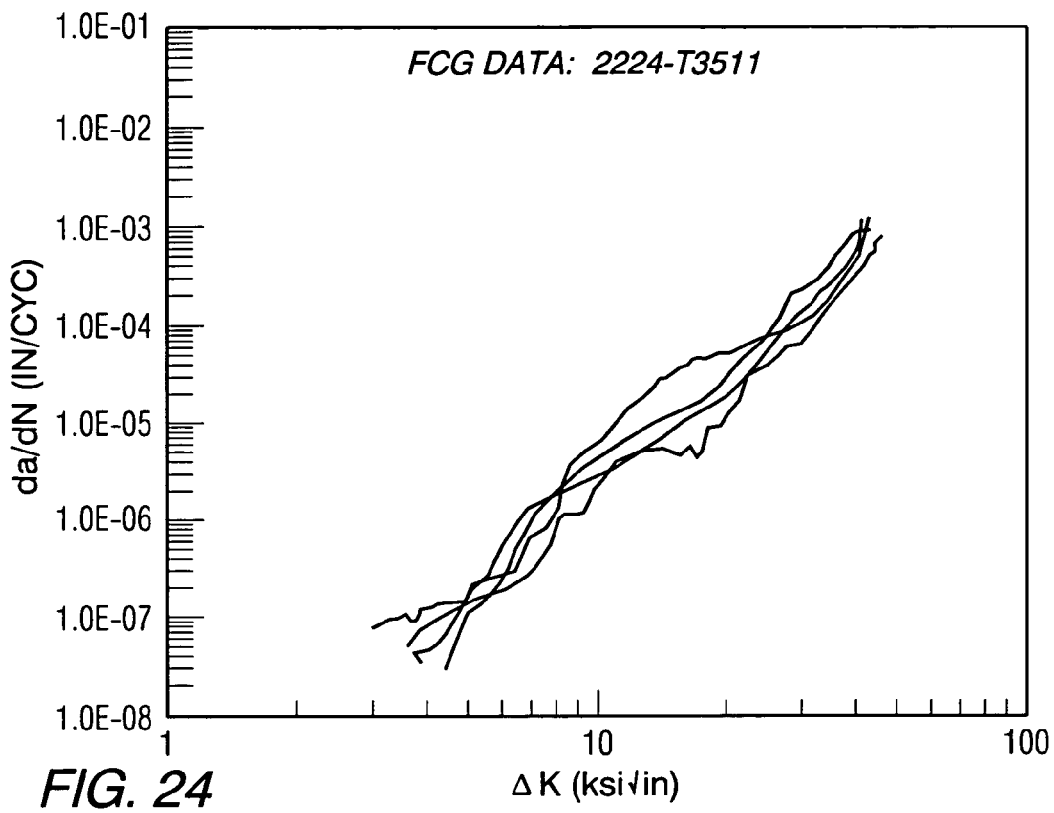

Similarly, the FCG rates provided in FIG. 24 show that there is little difference in FCG resistance among the square and rectangular extruded shapes; therefore texture likely does not have the same effect on 2224 as it does for 2026.

Figure 25:
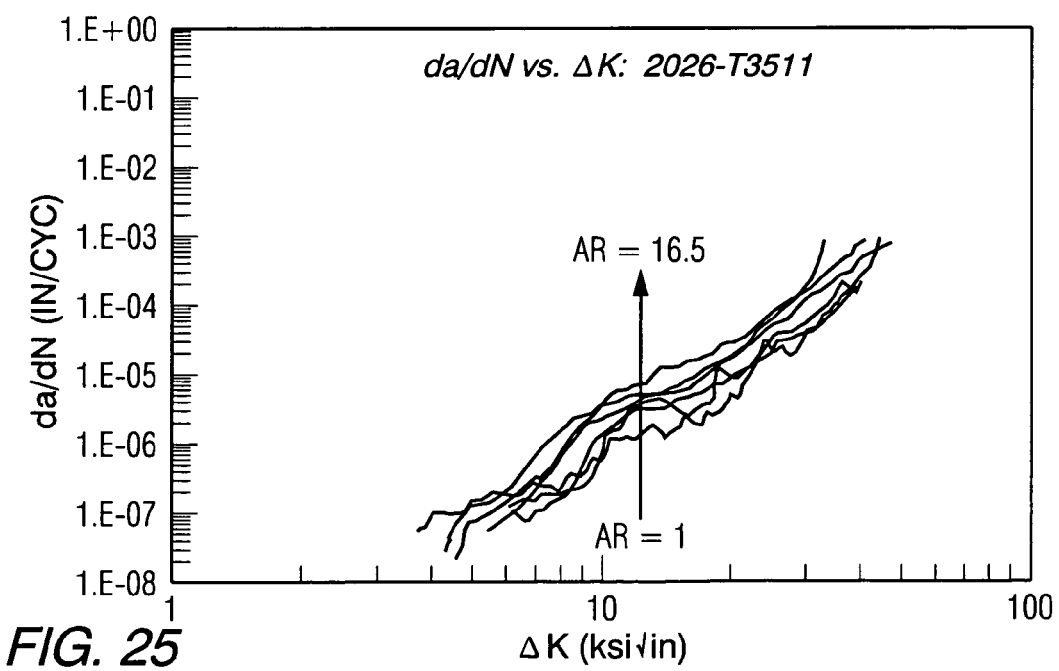

FIG. 25 shows further evidence of texture influence on 2026-T3511 extrusions: FIG. 25 is a collection of various extruded 2026-T3511 shapes with disparate geometries and aspect ratios. The aspect ratio for these shapes was calculated based on the local geometry where the specimen was taken. From these FCG rates, it is evident that the resistance to FCG decreases as the aspect ratio increases.

Figure 26:
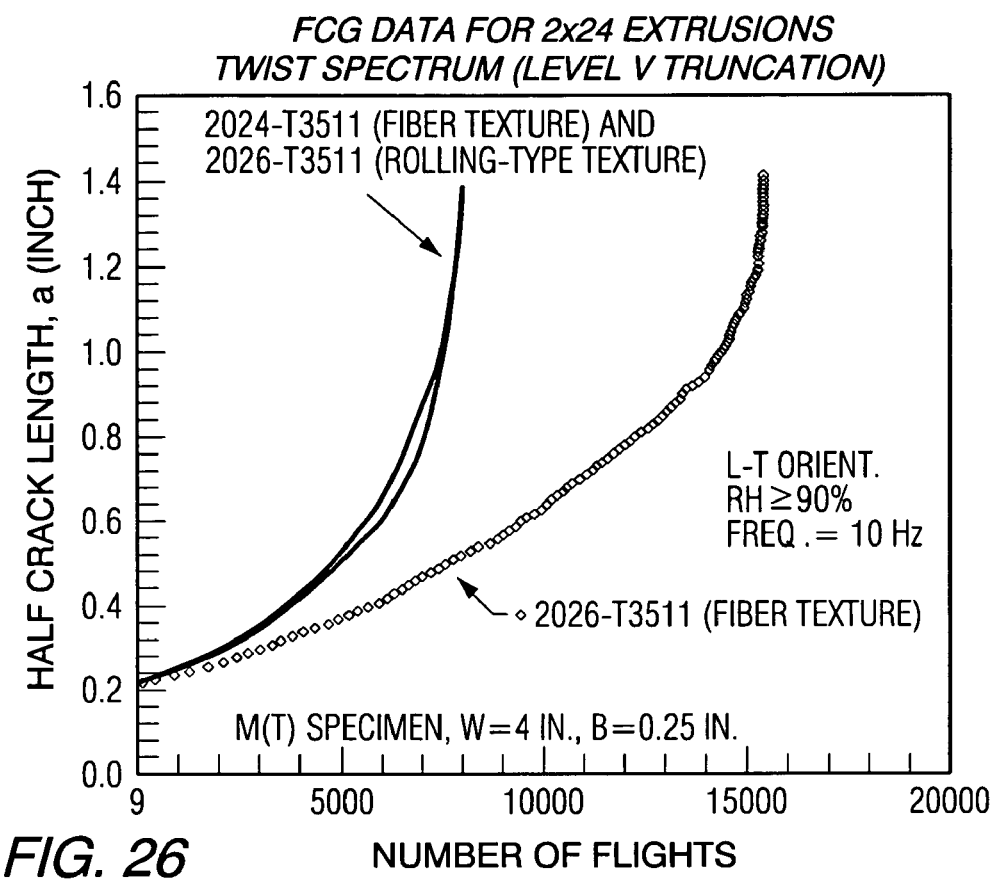

FIG. 26 shows FCG spectrum data. The data provided in FIG. 26 were obtained from the same extrusions evaluated in FIGS. 22–24. However, the specimens in this case were subjected to a spectrum FCG test, as opposed to a constant amplitude test for FIGS. 22–24. The TWIST spectrum simulates the load sequence that a lower wing of a single aisle passenger jet would experience during regular operations. The spectrum FCG data are more often more meaningful to airframe designers as they more closely represent service conditions, and often improvements in FCG resistance exhibited during constant amplitude FCG tests are absent during spectrum tests. The TWIST FCG data are plotted in FIG. 26 with the fatigue crack length shown as a function of flights. These data show that the 2026 square extrusion (with a fiber texture) did not fail until over 15,000 flights, whereas the 2024 square extrusions (with a fiber texture) and 2026 rectangular extrusions (with a rolling-type texture), both failed at just over 8,000 flights. Therefore, it can be concluded that 2026 square extrusions with a fiber texture provided nearly twice the service life as both 2024 square extrusions with a fiber texture and 2026 extrusions with a rolling-type texture.

Figure 27:
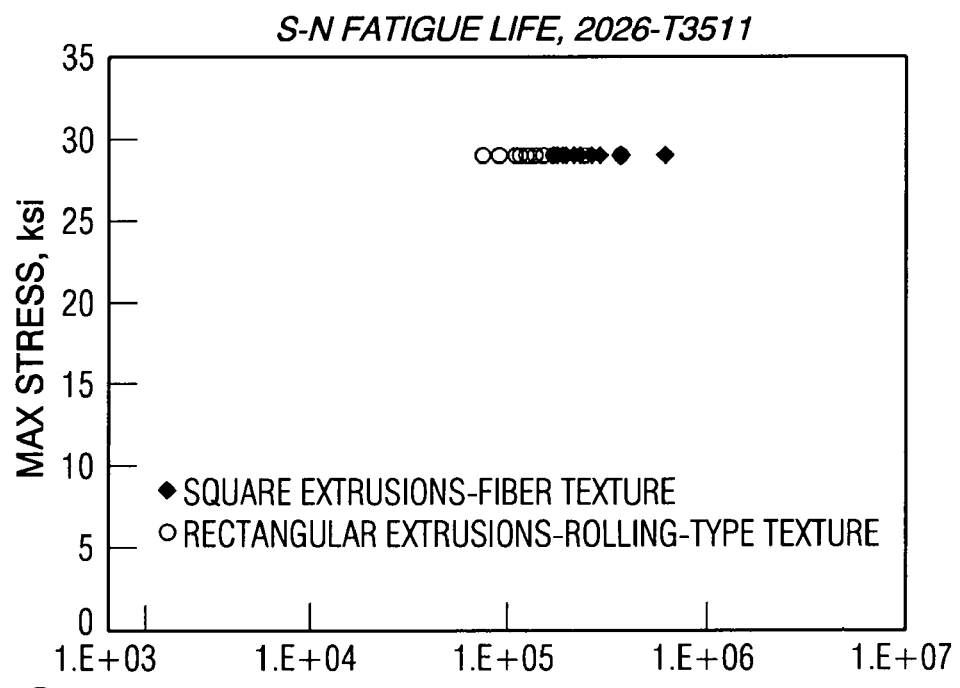
FIG. 27 shows stress-life fatigue data for Alloy 2026-T3511 extrusions with and without a fiber texture.

Stress controlled fatigue life tests were performed on the same 2026-T3511 extrusions, and the data are provided in FIG. 27. The data in FIG. 27 illustrate the improvement in fatigue initiation (S—N fatigue) for the 2026-T3511 extrusion with a fiber texture. The average life exhibited by the 2026-T3511 square extrusions is nearly 281,000 cycles, whereas the rectangular extrusions lasted only 157,000 cycles, which is nearly an 80% improvement. It should, however, be recognized that variability is inherent to fatigue data, and this is only illustrative of the benefits and not absolute. The actual improvement in service depends greatly on the loading conditions, environment and application.

Figure 28:
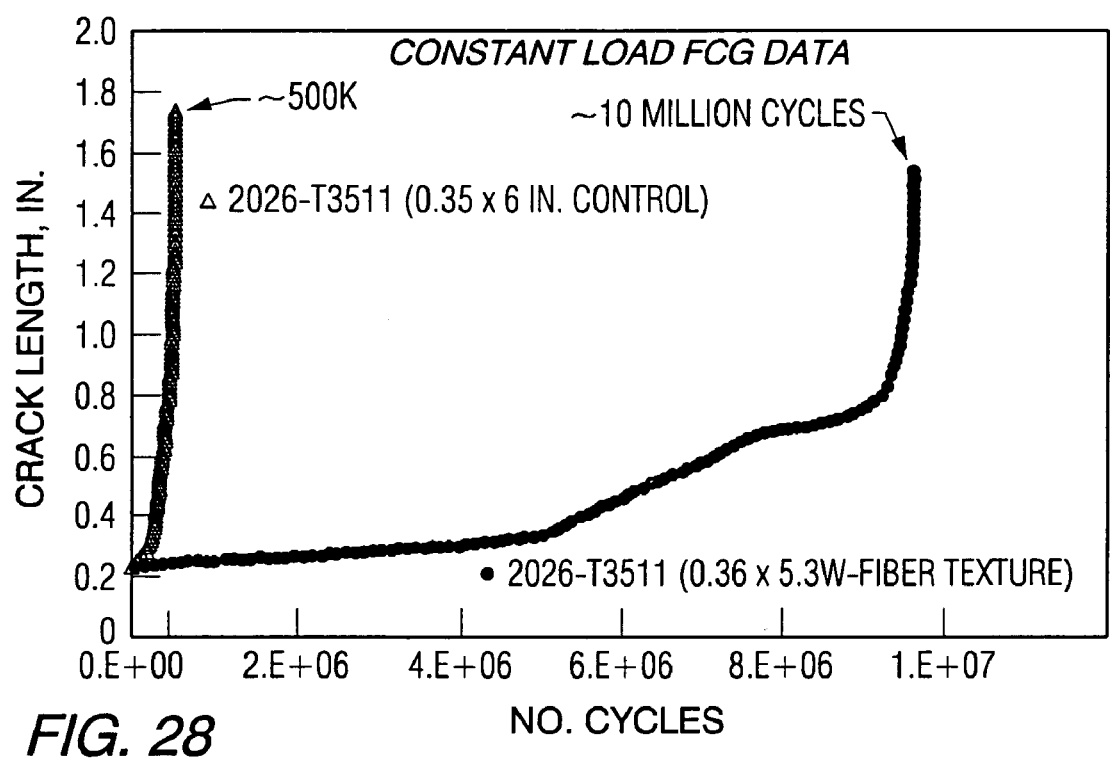

FIG. 28 shows the results from constant load FCG tests performed on the experimental extrusion of FIG. 3A and the baseline extrusion of FIG. 3B. The data in FIG. 28 are presented with the fatigue crack length shown as a function

TABLE 3

| | | da/dN (in/cycle) @ $\Delta K$ (ksi$\sqrt{in}$): | | | | | |
|---|---|---|---|---|---|---|---|
| Alloy | Shape | $\Delta K = 10$ | $\Delta K = 15$ | $\Delta K = 20$ | $\Delta K = 25$ | $\Delta K = 30$ | $\Delta K = 35$ |
| 2026 | Square | 1.06E−06 | 2.30E−06 | 8.55E−06 | 1.20E−05 | 3.08E−05 | 9.48E−05 |
| 2026 | Square | 6.67E−07 | 1.74E−06 | 4.41E−06 | 2.30E−05 | 3.89E−05 | 1.04E−04 |
| 2026 | Rect. | 3.48E−06 | 6.24E−06 | 1.86E−05 | 4.61E−05 | 1.14E−04 | 2.32E−04 |
| 2026 | Rect. | 3.97E−06 | 1.34E−05 | 2.74E−05 | 7.46E−05 | 1.58E−04 | 3.76E−04 | of the number of cyclic load cycles. These results show that the experimental extrusion of FIG. 3A did not fail until nearly 10,000,000 cycles, whereas the conventionally produced extrusion failed after roughly 500,000 cycles; over an order in magnitude of improvement. These data provide further evidence of the benefit in FCG resistance that can be achieved through selectively tailoring the texture.

Table 4 below shows property data from testing.

TABLE 4

| | | da/dN (in/cycle) @ $\Delta K$ (ksi$\sqrt{in}$): | | | | | |
|---|---|---|---|---|---|---|---|
| Alloy | Shape | $\Delta K = 10$ | $\Delta K = 15$ | $\Delta K = 20$ | $\Delta K = 25$ | $\Delta K = 30$ | $\Delta K = 35$ |
| 2024 | Square | 1.06E−05 | 2.84E−05 | 4.92E−05 | 8.35E−05 | 1.35E−04 | 2.37E−04 |
| 2024 | Square | 6.87E−06 | 2.51E−05 | 4.38E−05 | 6.46E−05 | 1.04E−04 | 1.98E−04 |
| 2024 | Rect. | 3.98E−06 | 9.39E−06 | 2.88E−05 | 1.24E−04 | 2.88E−04 | 5.85E−04 |
| 2024 | Rect. | 2.53E−06 | 1.44E−05 | 3.83E−05 | 8.40E−05 | 1.43E−04 | 3.42E−04 |
| 2026 | Square | 1.06E−06 | 2.30E−06 | 8.55E−06 | 1.20E−05 | 3.08E−05 | 9.48E−05 |
| 2026 | Square | 6.67E−07 | 1.74E−06 | 4.41E−06 | 2.30E−05 | 3.89E−05 | 1.04E−04 |
| 2026 | Rect. | 3.48E−06 | 6.24E−06 | 1.86E−05 | 4.61E−05 | 1.14E−04 | 2.32E−04 |
| 2026 | Rect. | 3.97E−06 | 1.34E−05 | 2.74E−05 | 7.46E−05 | 1.58E−04 | 3.76E−04 |
| 2224 | Square | 6.18E−06 | 3.06E−05 | 5.03E−05 | 7.69E−05 | 9.38E−05 | 1.39E−04 |
| 2224 | Square | 1.98E−06 | 5.55E−06 | 9.90E−06 | 3.65E−05 | 6.14E−05 | 1.41E−04 |
| 2224 | Rect. | 2.86E−06 | 7.93E−06 | 1.85E−05 | 6.63E−05 | 1.67E−04 | 3.42E−04 |
| 2224 | Rect. | 3.93E−06 | 1.16E−05 | 2.47E−05 | 7.33E−05 | 1.80E−04 | 3.42E−04 |

It is to be appreciated that certain features of the present invention may be changed without departing from the present invention. Thus, for example, it is to be appreciated that although the invention has been described in terms of a preferred embodiment in which 2xxx alloys are used, aluminum alloys comprehended by the present invention are 2xxx, 5xxx, 6xxx, 7xxx and 8xxx alloys. A preferred composition for the 2xxx alloys is about 3.6 to about 4.9 wt. % copper, about 1.0 to about 1.8 wt. % magnesium, about 0.15 to about 0.9 wt. % manganese, about 0.05 to about 0.25% zirconium, less than about 0.25% zinc, less than about 0.8 silver, less than about 0.3% iron, less than about 0.25% silicon, the balance substantially aluminum, incidental elements and impurities.

In addition, the invention is intended to be used on aluminum lithium alloys. A preferred aluminum lithium composition about 0.5 to about 2.7 wt. % lithium, about 1.0 to about 4.5 wt. % copper, less than about 1.3 wt. % magnesium, less than about 0.8 silver, about 0.15 to about 0.9 wt. % manganese, about 0.04 to about 0.16% zirconium, less than about 0.25% zinc, less than about 0.3% iron, less than about 0.20% silicon, the balance substantially aluminum, incidental elements and impurities.

In addition, the invention is not limited to forming the increased amount of <100> and <111> fiber components in the local geometries by intentionally extruding oversized local geometries which promote primarily axisymmetric metal flow during extrusion and then b.) removing excess metal in these local geometries. Those skilled in the art will recognize that die design, spreader plates and/or feeder plates can be used to form increased amount of amount of <100> and <111> fiber components in the local geometries.

Although the invention was described in terms of a single step extrusion, a double extrusion practice could be used in which a billet is extruded to a round extrusion which is then used as billet to extrude to a final near net shape. The first extrusion step would produce a fiber texture would be retained in critical regions of the near net shape.

In addition, those skilled in the art will recognize that the invention is not limited to extrusion. Other forming methods can be employed to form the increased amount of amount of <100> and <111> fiber components in the local geometries. Upset forging and rolling may also be used.

If ingot rolling is to be employed, it is preferred that the ingot section have a height that is 2–4 times the width. Most aluminum ingot has a thickness dimension that is much lower than the width dimension. As rolling proceeds, the thickness is reduced and the width remains virtually unchanged as the ingot is rolled to plate or sheet. It is well known, however, that if an ingot is rolled starting with a thickness greater than the width, substantial increase in width will occur as rolling proceeds. As a result of this width increase, a fiber texture develops. The fiber texture will provide an increase in the damage tolerance as described earlier. Therefore, the reduction during ingot rolling are preferably such that the ratio of half the entry width to the contact length of the plate and roll is less than 1.75. The contact length is equal to the roll diameter divided by the draft.

Furthermore, it is contemplated that those skilled in the art will recognize that the structural members do not necessarily need to be randomly altered with the increased amount of <100> and <111> fiber components in the local geometries. Rather, the local geometries can be positioned within the structural members in areas in which damage tolerance and an increased resistance to fatigue crack growth is especially critical. Thus for example of the amount of <100> and <111> fiber components can be increased in an area which will be riveted or welded and a larger area surrounding these areas.

It is also to be appreciated that although the invention has been described in terms of metals, the present invention may also be employed with metal matrix composites, metal laminates, bimetallics and cermets.

What is believed to be the best mode of the invention has been described above. However, it will be apparent to those skilled in the art that numerous variations of the type described could be made to the present invention without departing from the spirit of the invention. The scope of the present invention is defined by the broad general meaning of the terms in which the claims are expressed.

Having described the presently preferred embodiments, it is to be understood that the invention may be otherwise embodied within the scope of the appended claims.

What is claimed is:

1. An extruded structural member having improved damage tolerance, said structural member comprising:
   at least one area having a substantially unrecrystallized microstructure with intentionally increased amounts of fiber texture of at least one area to reduce the rate of fatigue crack growth in said extruded structural member
   wherein said intentionally increased fiber texture of said least one area is formed by intentionally extruded local geometries which promote primarily axisymmetric metal flow and then removing excess metal in said local geometries.

2. The extruded structural member of claim 1 wherein said least one area has an intentionally increased amount of <100> and <111> fiber components.

3. The extruded structural member of claim 1 wherein said structural member has at least one pair of structural stiffening members and said least one area is an intra-stiffener area formed between said pair of structural stiffening members.

4. The extruded structural member of claim 3 wherein said intentionally increased fiber texture of said intra-stiffener area is created by intentionally extruded local geometries which promote primarily axisymmetric metal flow and then machining said local geometries which promote primarily axisymmetric metal flow after extrusion.

5. The extruded structural member of claim 3 wherein said intentionally increased fiber texture of said intra-stiffener area is created by intentionally extruded local geometries which promote primarily axisymmetric metal flow and then milling said local geometries which promote primarily axisymmetric metal flow after extrusion.

6. The extruded structural member of claim 3 wherein said intentionally increased fiber texture of said intra-stiffener area is created during extrusion by the use of spreaders in the die used to form the extrusion.

7. The extruded structural member of claim 3 wherein said intentionally increased fiber texture of said intra-stiffener area is created during extrusion by the use of feeder plates or double extrusion.

8. The extruded structural member of claim 3 wherein said structural stiffening members have a T-shaped cross-sectional area.

9. The extruded structural member of claim 3 wherein said structural stiffening members have a J-shaped cross-sectional area.

10. The extruded structural member of claim 3 wherein said structural stiffening members have a L-shaped cross-sectional area.

11. The extruded structural member of claim 3 wherein said structural stiffening members have a hat-shaped cross-sectional area.

12. The extruded structural member of claim 3 wherein said structural stiffening members have a Z-shaped cross-sectional area.

13. The extruded structural member of claim 3 wherein said structural stiffening members are substantially parallel.

14. The extruded structural member of claim 1 wherein said extruded structural member is fabricated from a single aluminum alloy.

15. The extruded structural member of claim 1 wherein said extruded structural member is fabricated from at least two aluminum alloys which are co-extruded.

16. The extruded structural member of claim 1 wherein said extruded structural member is fabricated from a substantially unrecrystallized extrusion selected from the group consisting of 2xxx, 5xxx, 6xxx, 7xxx and 8xxx alloys.

17. The extruded structural member of claim 1 wherein said extruded structural member is fabricated from a substantially unrecrystallized extrusion selected from the group consisting of 2x24, 2x26, 2x27 and 2x2x alloys.

18. The extruded structural member of claim 1 wherein said local geometries which promote primarily axisymmetric metal flow are selected from the group consisting of circles, squares, polygons and irregular shapes with aspect ratio within the range of about 0.5 to about 2.0.

19. The extruded structural member of claim 1 wherein said structural member has increased fatigue crack growth resistance.

20. The extruded structural member of claim 1 wherein said structural member has increased resistance to fatigue initiation.

21. The extruded structural member of claim 1 wherein said structural member has increased toughness.

22. The extruded structural member of claim 1 wherein said structural member is a monolithic structure.

23. The extruded structural member of claim 1 wherein said structural member is an integrally stiffened panel.

24. The extruded structural member of claim 1 wherein said extruded structural member is fabricated from a substantially unrecrystallized extrusion, said extrusion comprising:
   about 3.6 to about 4.9 wt. % copper,
   about 1.0 to about 1.8 wt. % magnesium,
   about 0.15 to about 0.9 wt. % manganese,
   about 0.05 to about 0.25% zirconium,
   less than about 0.25% zinc,
   less than about 0.8 silver,
   less than about 0.3% iron,
   less than about 0.25% silicon,
   the balance substantially aluminum, incidental elements and impurities.

25. The extruded structural member of claim 1 wherein said extruded structural member is fabricated from a substantially unrecrystallized extrusion selected from the group consisting of 7xxx, 7x50, 7x55 and 7085 alloys.

26. The extruded structural member of claim 1 wherein said extruded structural member is fabricated from a substantially unrecrystallized extrusion selected from the group consisting of 2x9x and 8x9x alloys.

27. The extruded structural member of claim 1 wherein said extruded structural member is fabricated from a substantially unrecrystallized extrusion selected from the group consisting of aluminum 2xxx alloys, 5xxx alloys, 6xxx alloys, 7xxx alloys, and those 8xxx alloys that contain lithium.

28. The extruded structural member of claim 1 wherein said extruded structural member is fabricated from a substantially unrecrystallized extrusion, said extrusion comprising:
   about 0.5 to about 2.7 wt. % lithium,
   about 1.0 to about 4.5 wt. % copper,
   less than about 1.3 wt. % magnesium,
   about 0.15 to 0.9 wt. % manganese,
   about 0.04 to about 0.16% zirconium, less than about 0.25% zinc,
less than about 0.8 silver,
less than about 0.3% iron,
less than about 0.20% silicon,
the balance substantially aluminum, incidental elements and impurities.

29. The extruded structural member of claim 1 wherein said extruded structural member is fabricated from a substantially unrecrystallized extrusion selected from the group consisting of aluminum alloys containing less than about 3.0% lithium.

30. The extruded structural member of claim 1 wherein said extruded structural member is fabricated from a substantially unrecrystallized extrusion selected from the group consisting of Al—Cu—Mg—Ag system.

31. The extruded structural member of claim 1 wherein said extruded structural member is useful in aerospace structures of the group consisting of rib stiffening sections for wing box, empennage and fuselage.

32. The extruded structural member of claim 1 wherein said extruded structural member is useful in aerospace structures of the group consisting of stiffening members, spars, stringers, stiffeners, monolithic spar caps and built-up spar caps.

33. An extruded structural member having improved damage tolerance, said structural member comprising:
  a base section;
  a stiffening section having at least one pair of structural stiffeners, said structural stiffeners are integral with said base section and projecting outwardly thereof; and
  at least one intra-stiffener area positioned between said pair of structural stiffeners, said intra-stiffener area having a microstructure with intentionally increased amounts of fiber texture to reduce the rate of fatigue crack growth in said extruded structural member wherein said intentionally increased fiber texture of said least one intra stiffener area is formed by intentionally extruded local geometries which promote primarily axisymmetric metal flow and then removing excess metal in said local geometries.

* * * * *